US012623756B1

(12) United States Patent
Rosario-Gonzalez et al.

(10) Patent No.: US 12,623,756 B1
(45) Date of Patent: May 12, 2026

(54) SYSTEMS AND METHODS FOR VISUALIZING A VIRTUAL BOUNDARY OF A MARINE VESSEL IN AN EXTENDED REALITY SCENE THAT INCLUDES A NON-VIRTUAL MARINE VESSEL

(71) Applicant: Brunswick Corporation, Mettawa, IL (US)

(72) Inventors: Efrain Rosario-Gonzalez, Rockledge, FL (US); Trevor George, Savoy, IL (US); Aadish Dilip Naik, Champaign, IL (US)

(73) Assignee: Brunswick Corporation, Mettawa, IL (US)

( * ) Notice: Subject to any disclaimer, the term of this patent is extended or adjusted under 35 U.S.C. 154(b) by 52 days.

(21) Appl. No.: 18/432,806

(22) Filed: Feb. 5, 2024

(51) Int. Cl.
| | |
|---|---|
| *B63B 49/00* | (2006.01) |
| *B63B 79/10* | (2020.01) |
| *G06T 15/20* | (2011.01) |

(52) U.S. Cl.
CPC .............. *B63B 49/00* (2013.01); *B63B 79/10* (2020.01); *G06T 15/20* (2013.01)

(58) Field of Classification Search
CPC .......... B63B 49/00; B63B 79/10; G06T 15/20
See application file for complete search history.

(56) References Cited

U.S. PATENT DOCUMENTS

| | | | |
|---|---|---|---|
| 6,273,771 | B1 | 8/2001 | Buckley et al. |
| 9,751,607 | B1 | 9/2017 | Kollmann et al. |
| 9,927,520 | B1 | 3/2018 | Ward et al. |
| 10,259,555 | B2 | 4/2019 | Ward et al. |
| 11,373,537 | B2 | 6/2022 | Derginer et al. |
| 11,403,955 | B2 | 8/2022 | Derginer et al. |
| 2020/0090367 | A1 | 3/2020 | Nishiyama |
| 2020/0180741 | A1* | 6/2020 | Forrester ................. G06F 3/011 |
| 2020/0369351 | A1* | 11/2020 | Behrendt ............... G06V 20/00 |
| 2022/0024314 | A1* | 1/2022 | Yagyu .................... B60K 35/23 |
| 2023/0195118 | A1* | 6/2023 | Singh ..................... B63B 79/15 |
| | | | 701/21 |

OTHER PUBLICATIONS

Unpublished U.S. Appl. No. 18/302,602 by Lee Rosario filed Apr. 18, 2023.
Unpublished U.S. Appl. No. 18/468,052 by Brandon L Tate filed Sep. 15, 2023.

* cited by examiner

Primary Examiner — Naeem Taslim Alam
(74) Attorney, Agent, or Firm — Andrus Intellectual Property Law, LLP

(57) ABSTRACT

A system for visualizing a virtual boundary in a scene that includes a non-virtual marine vessel is provided, the system comprising: a display device; and one or more hardware processors configured to: receive information indicative of a boundary position at which to present a virtual boundary within an extended reality (XR) scene with respect to the marine vessel; present, using the display device, the XR scene including the virtual boundary based on the boundary position, wherein a size and view of the virtual boundary in the XR scene is based on a viewing perspective at which the XR scene is viewed; and update the XR scene as the marine vessel moves.

20 Claims, 16 Drawing Sheets

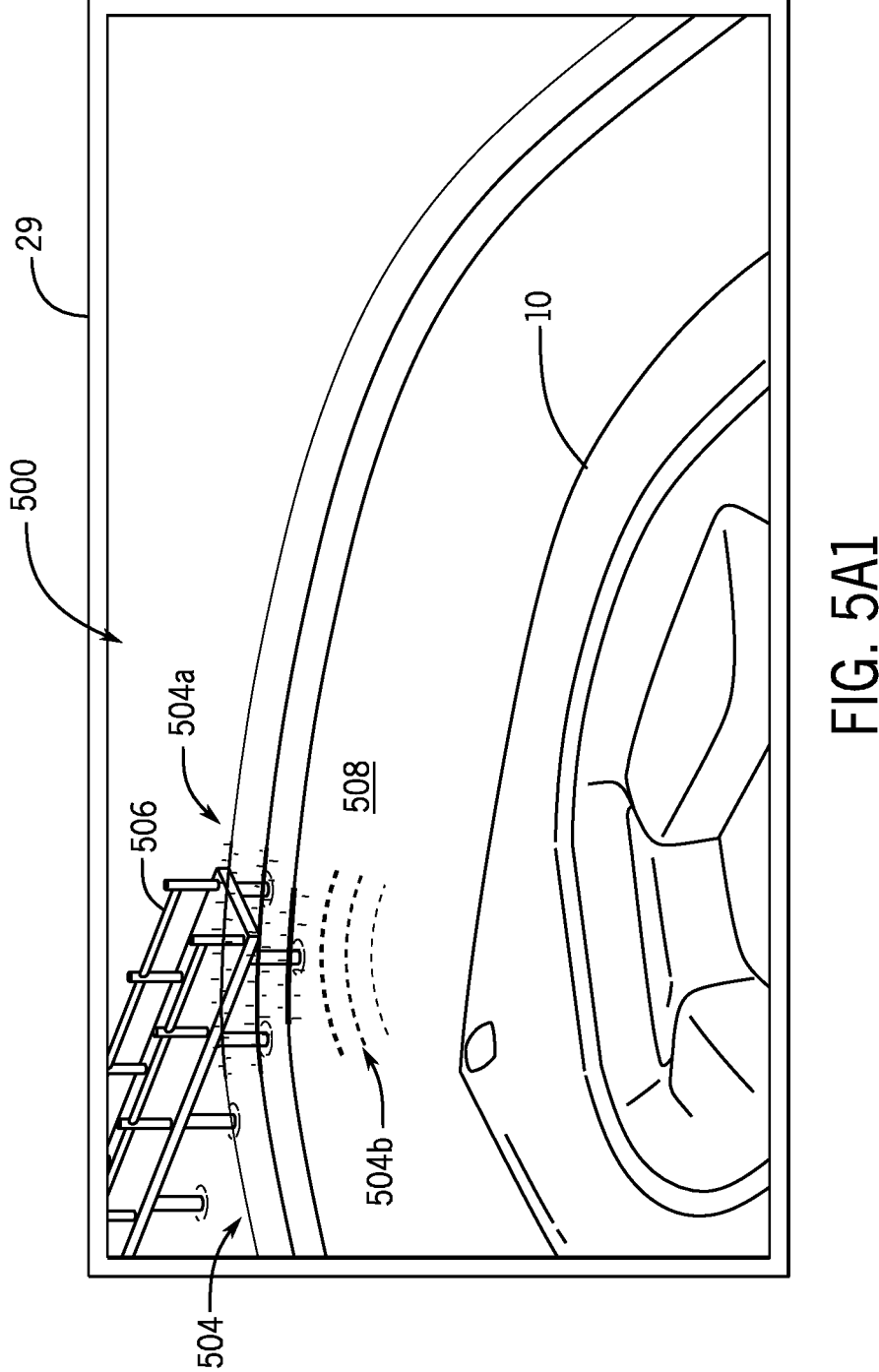
FIG. 5A1

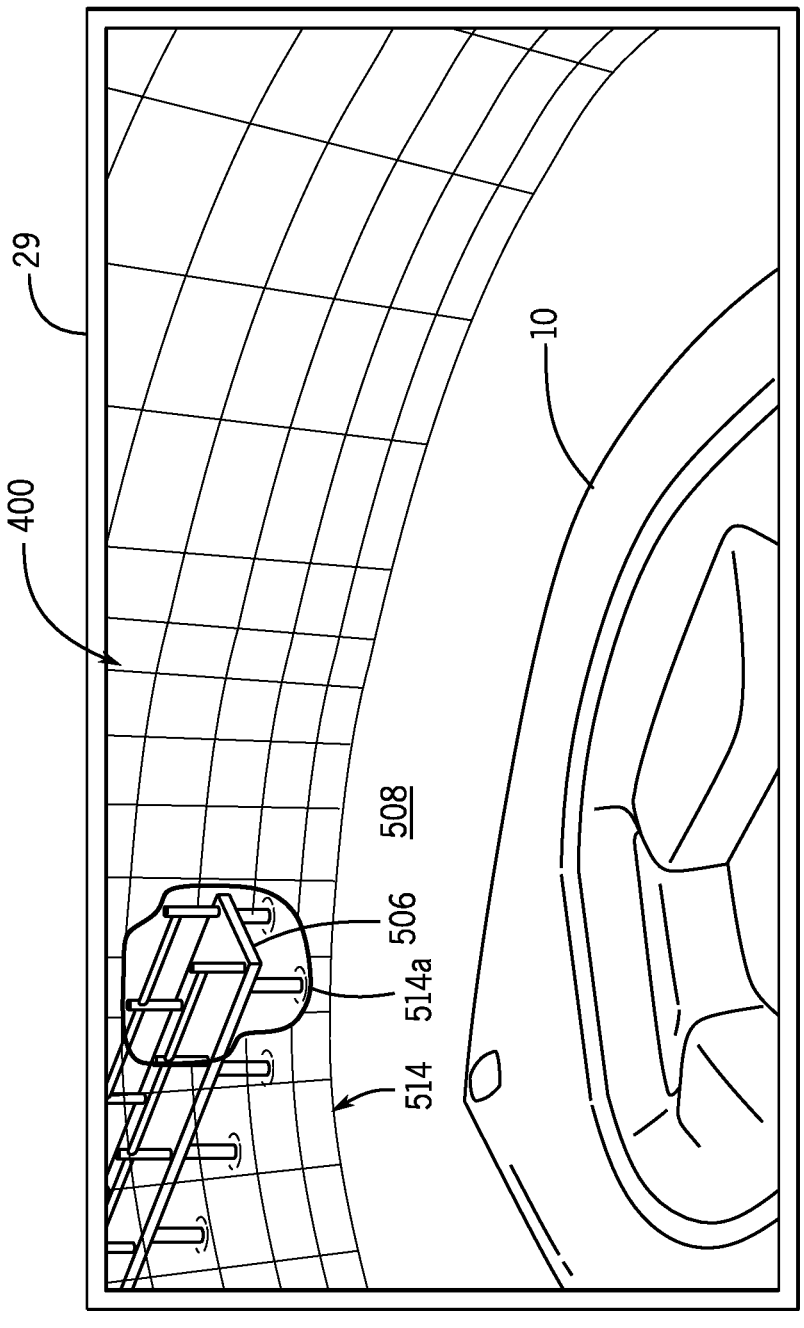
FIG. 5A2

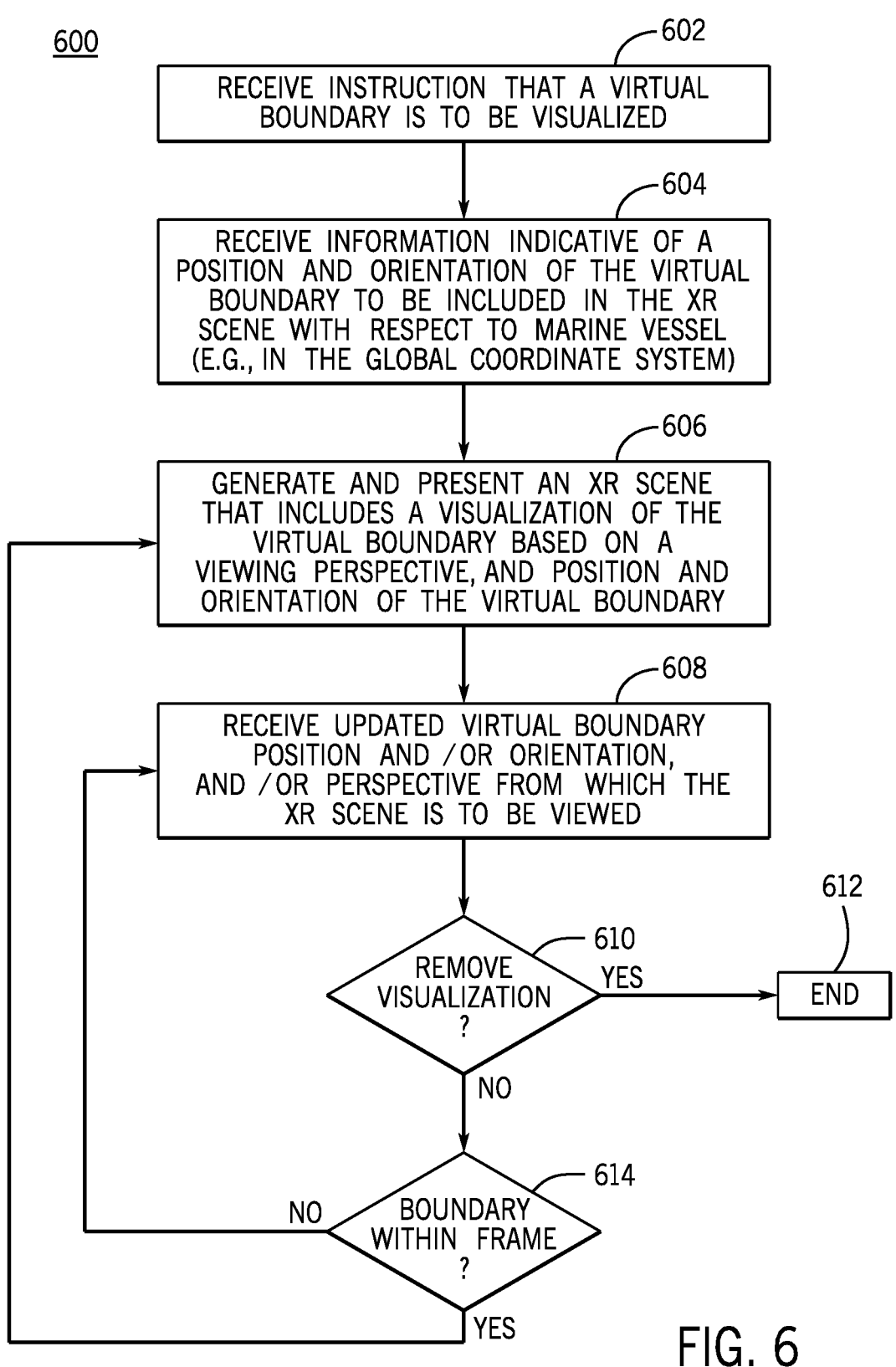

600

602
RECEIVE INSTRUCTION THAT A VIRTUAL
BOUNDARY IS TO BE VISUALIZED

604
RECEIVE INFORMATION INDICATIVE OF A
POSITION AND ORIENTATION OF THE VIRTUAL
BOUNDARY TO BE INCLUDED IN THE XR
SCENE WITH RESPECT TO MARINE VESSEL
(E.G., IN THE GLOBAL COORDINATE SYSTEM)

606
GENERATE AND PRESENT AN XR SCENE
THAT INCLUDES A VISUALIZATION OF THE
VIRTUAL BOUNDARY BASED ON A
VIEWING PERSPECTIVE, AND POSITION AND
ORIENTATION OF THE VIRTUAL BOUNDARY

608
RECEIVE UPDATED VIRTUAL BOUNDARY
POSITION AND / OR ORIENTATION,
AND / OR PERSPECTIVE FROM WHICH THE
XR SCENE IS TO BE VIEWED

610
REMOVE
VISUALIZATION
?

612
YES → END

NO

614
BOUNDARY
WITHIN FRAME
?

NO

YES

FIG. 6

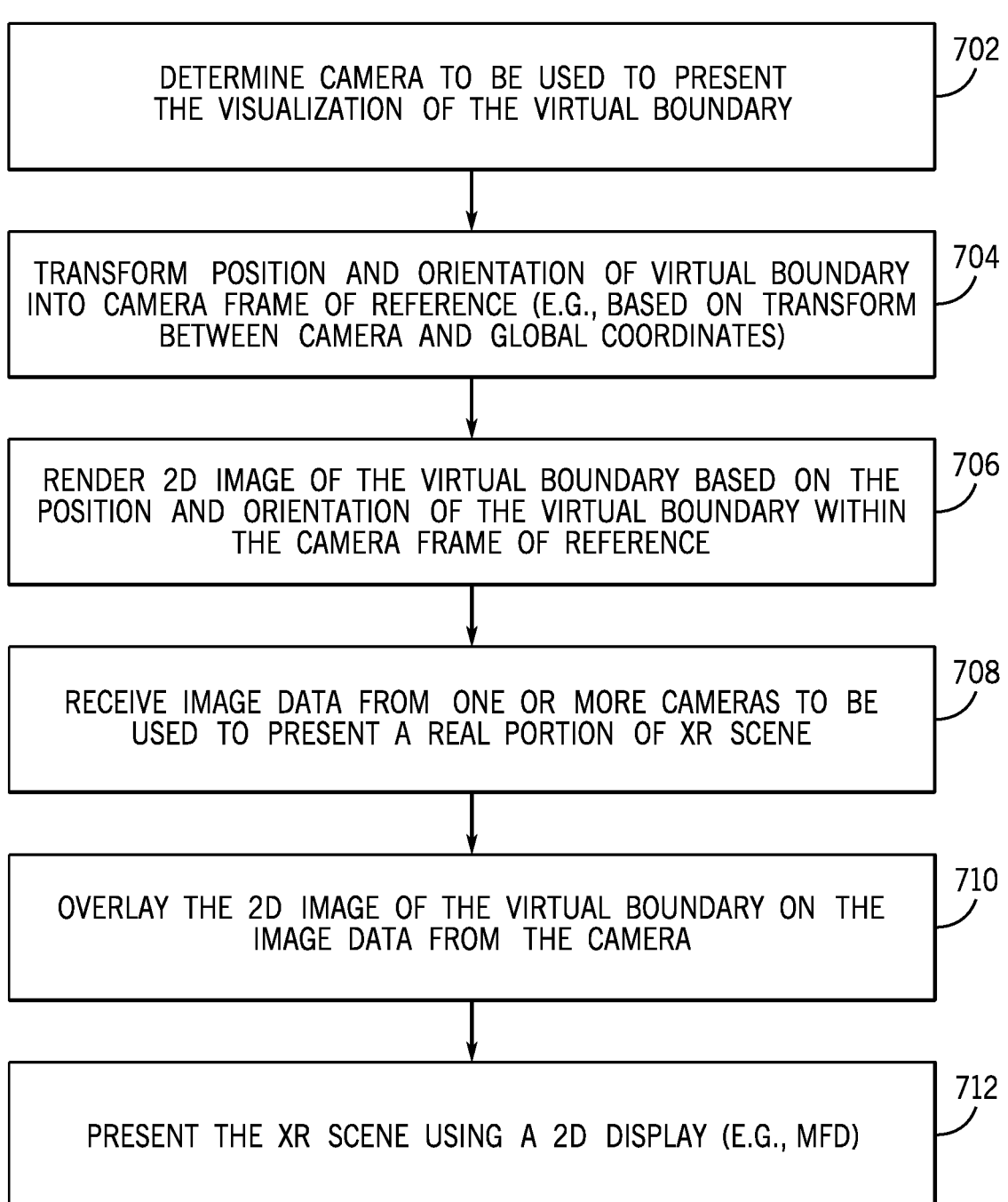

700

DETERMINE CAMERA TO BE USED TO PRESENT THE VISUALIZATION OF THE VIRTUAL BOUNDARY — 702

TRANSFORM POSITION AND ORIENTATION OF VIRTUAL BOUNDARY INTO CAMERA FRAME OF REFERENCE (E.G., BASED ON TRANSFORM BETWEEN CAMERA AND GLOBAL COORDINATES) — 704

RENDER 2D IMAGE OF THE VIRTUAL BOUNDARY BASED ON THE POSITION AND ORIENTATION OF THE VIRTUAL BOUNDARY WITHIN THE CAMERA FRAME OF REFERENCE — 706

RECEIVE IMAGE DATA FROM ONE OR MORE CAMERAS TO BE USED TO PRESENT A REAL PORTION OF XR SCENE — 708

OVERLAY THE 2D IMAGE OF THE VIRTUAL BOUNDARY ON THE IMAGE DATA FROM THE CAMERA — 710

PRESENT THE XR SCENE USING A 2D DISPLAY (E.G., MFD) — 712

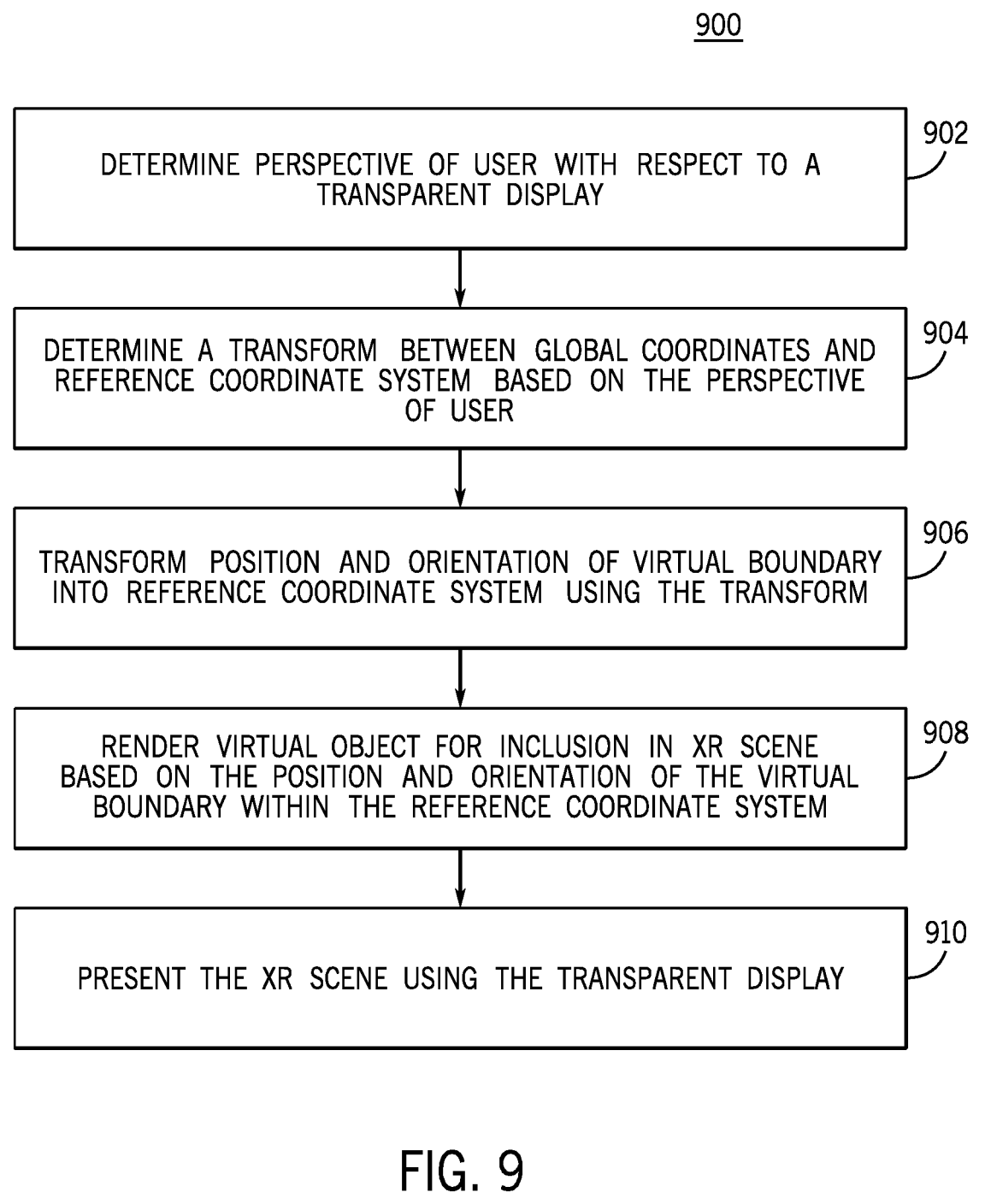

DETERMINE PERSPECTIVE OF USER WITH RESPECT TO A TRANSPARENT DISPLAY | 902

DETERMINE A TRANSFORM BETWEEN GLOBAL COORDINATES AND REFERENCE COORDINATE SYSTEM BASED ON THE PERSPECTIVE OF USER | 904

TRANSFORM POSITION AND ORIENTATION OF VIRTUAL BOUNDARY INTO REFERENCE COORDINATE SYSTEM USING THE TRANSFORM | 906

RENDER VIRTUAL OBJECT FOR INCLUSION IN XR SCENE BASED ON THE POSITION AND ORIENTATION OF THE VIRTUAL BOUNDARY WITHIN THE REFERENCE COORDINATE SYSTEM | 908

PRESENT THE XR SCENE USING THE TRANSPARENT DISPLAY | 910

FIG. 9

SYSTEMS AND METHODS FOR VISUALIZING A VIRTUAL BOUNDARY OF A MARINE VESSEL IN AN EXTENDED REALITY SCENE THAT INCLUDES A NON-VIRTUAL MARINE VESSEL

FIELD

The present disclosure generally relates to systems and methods for visualizing a virtual boundary of a marine vessel in an extended reality scene that includes a non-virtual marine vessel.

BACKGROUND

The following U.S. Patents are incorporated herein by reference, in entirety:

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Pat. No. 11,373,537 discloses a propulsion control system on a marine vessel that includes at least one propulsion device configured to propel the marine vessel, at least one input device manipulatable to provide user control input to control a movement direction and velocity of the marine vessel, at least one proximity sensor system configured to generate proximity measurements describing a proximity of an object with respect to the marine vessel, and a controller. The controller is configured to limit user input authority over propulsion output in a direction of the object by at least one propulsion device based on the proximity measurement so as to maintain the marine vessel at least a buffer distance from the object, and then to suspend the maintenance of the buffer distance from the object upon receipt of a user-generated instruction to do so. Upon receipt of a user control input via the user input device to move the marine vessel in the direction of the object, the controller controls the at least one propulsion device based on the user control input such that the marine vessel approaches and impacts the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. patent application Ser. No. 18/302,602 discloses a system configured to assist a user in identifying an object in an area outside a marine vessel. An image sensor is configured to collect imaging data for the area outside the marine vessel. A display device is configured to generate a display on a windshield assembly. The windshield assembly comprises a windshield and a frame adjacent to at least one side of the windshield. A control system is configured to analyze the imaging data to identify an object within the area outside the marine vessel and to control the display device to generate a display to visually indicate the object on the windshield assembly, where the display assists the user positioned at a helm of the marine vessel in identifying the object through the windshield.

SUMMARY

In accordance with some embodiments of the disclosed subject matter, a system for visualizing a virtual boundary in a scene that includes a non-virtual marine vessel is provided, the system comprising: a display device; and one or more hardware processors configured to: receive information indicative of a boundary position at which to present a virtual boundary within an extended reality (XR) scene with respect to the marine vessel; present, using the display device, the XR scene including the virtual boundary based on the boundary position, wherein a size and view of the virtual boundary in the XR scene is based on a viewing perspective at which the XR scene is viewed; and update the XR scene as the marine vessel moves.

In some embodiments, the system further comprises: a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system; wherein the one or more hardware processors are further configured to: receive virtual boundary data; determine that the virtual boundary is at least partially within the field of view of the first camera; determine a position of the virtual boundary within the camera coordinate system associated with the first camera; render a two-dimensional image of the virtual boundary based on the virtual boundary data, the position of the virtual boundary within the camera coordinate system associated with the first camera, and a viewing perspective of the first camera; receive image data from the first camera; generate a view of the XR scene based on the image data and the two-dimensional image of the virtual boundary, such that the virtual boundary appears to be present in the view of the XR scene at the boundary position; and present, using the display device, the view of the XR scene.

In some embodiments, the one or more hardware processors are further configured to: determine that the marine vessel has moved with respect to the position of the virtual boundary within the camera coordinate system associated with the first camera; determine an updated position of the virtual boundary within the camera coordinate system associated with the first camera based on movement of the marine vessel; render a second two-dimensional image of the virtual boundary based on the updated position of the virtual boundary and an updated viewing perspective of the first camera; receive additional image data from the first camera; generate an updated view of the XR scene based on the additional image data and the second two-dimensional image of the virtual boundary, such that the virtual boundary appears to be present in the updated view of the XR scene at the boundary position; and present, using display device, the updated view of the XR scene.

In some embodiments, the display device comprises a multi-function display of the marine vessel.

In some embodiments, the system further comprises: a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system; wherein the one or more hardware processors are further configured to: generate, using a real-time graphics engine, a digital twin of the marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with one of the plurality of cameras; receive virtual boundary data; place the virtual boundary in the virtual environment with a virtual boundary position corresponding the boundary position; determine that the virtual boundary is at least partially within the field of view of the first virtual camera; render, using the real-time graphics engine, a two-dimensional image of the virtual environment from a point of view of the first virtual camera based on the virtual boundary data; receive image data from the first camera; generate a view of the XR scene based on the image data and the two-dimensional image of the virtual environment, such that the virtual boundary appears to be present in the view of the XR scene at the boundary position; and present, using the display device, the view of the XR scene.

In some embodiments, the display device comprises a display of a wearable extended reality device, and wherein the system further comprises a head tracking device in communication with at least one hardware processor of the one or more hardware processors.

In some embodiments, the one or more hardware processors are further configured to: receive virtual boundary data; determine a position and orientation of the wearable extended reality device with respect to the marine vessel based at least in part on data from the head tracking device; determine a position and orientation of the virtual object in a reference coordinate system associated with the wearable extended reality device; determine that the virtual boundary position is at least partially within a field of view of the wearable extended reality device based on the boundary position; render an image of the virtual boundary based on the virtual boundary data, the position and orientation of the virtual object within the reference coordinate system, and the position and orientation of the wearable extended reality device; and present, using the display device, the rendered image of the virtual boundary in a position on the display device such that the virtual boundary appears to be present in the view of the XR scene at the boundary position.

In some embodiments, the display device comprises a display of a heads-up display (HUD) device integrated into a windshield of the marine vessel.

In some embodiments, the one or more hardware processors are further configured to: receive virtual boundary data; determine the viewing perspective from which a user is viewing the HUD; determine a position and orientation of the virtual boundary in a reference coordinate system associated with the HUD and the viewing perspective of the user; determine that the virtual boundary is at least partially within a field of view of the user via the HUD; render an image of the virtual boundary based on the position of the virtual boundary within the reference coordinate system; and present, using the display device, the rendered image of the virtual boundary in a position on the HUD such that the virtual boundary appears to the user to be present in the view of the XR scene at the boundary position.

In some embodiments, the one or more hardware processors are further configured to: receive, from an autonomy system of the marine vessel, virtual boundary data comprising a shape and size of the virtual boundary.

In accordance with some embodiments of the disclosed subject matter, a method for presenting virtual objects in a scene that includes a non-virtual marine vessel is provided, the method comprising: receiving information indicative of a boundary position at which to present a virtual boundary within an extended reality (XR) scene with respect to the marine vessel; presenting, using a display device, the XR scene including the virtual boundary based on the boundary position, wherein a size and view of the virtual boundary in the XR scene is based on a viewing perspective at which the XR scene is viewed; and updating the XR scene as the marine vessel moves.

BRIEF DESCRIPTION OF THE DRAWINGS

The present disclosure is described with reference to the following drawings.

FIG. 5A1 shows an example of an extended reality scene that includes a non-virtual marine vessel and a virtual boundary being presented by a two-dimensional display of the marine vessel in accordance with some embodiments of the disclosure.

FIG. 5A2 shows another example of an extended reality scene that includes a non-virtual marine vessel and a virtual boundary being presented by a two-dimensional display of the marine vessel in accordance with some embodiments of the disclosure.

FIG. 6 shows an example of a process for presenting one or more virtual boundaries in an extended reality scene that includes a non-virtual marine vessel in accordance with some embodiments of the disclosure.

FIG. 7 shows an example of a process for visualizing a virtual boundary in an extended reality scene using a two-dimensional display of the marine vessel in accordance with some embodiments of the disclosure.

FIG. 9 shows an example of a process for visualizing a virtual boundary in an extended reality scene using a heads-up display of a marine vessel in accordance with some embodiments of the disclosure.

DETAILED DESCRIPTION

Autonomy systems on marine vessels that are capable of automating some navigation tasks and/or implementing safety features, such as collision avoidance, are becoming more common. For example, an autonomy system can be configured maintain a buffer distance around the marine vessel, such that the marine vessel is inhibited from moving closer than the buffer distance to any objects. However, it may not be clear to an operator why the autonomy system of the marine vessel is inhibiting certain movements (e.g., movements close to another boat, a navigation aid, etc.), or why the marine vessel is slowing down as it approaches an object that the operator may not be able to see from an operation console (e.g., because the object is in a blind spot).

In some embodiments, mechanisms described herein can facilitate visualization of virtual boundaries (such as buffer areas for maintaining a buffer distance) in an extended reality scene that can be presented to an operator of a marine vessel. In some embodiments, visualizing such a virtual boundary can enhance an operator's understanding of an environment of the marine vessel, and/or more accurately anticipate when an autonomy system can be expected to impact movement of the marine vessel.

Additionally, in some embodiments, mechanisms described herein can present a virtual boundary that can be monitored by an autonomy system of a marine vessel, and that may be larger than a buffer zone described above, in an extended reality scene that includes a portion of the environment. For example, an autonomy system can monitor an area within and/or around a virtual boundary for objects that an operator may wish to avoid getting too close to, such as other boats, shallow areas, etc. In such an example, mechanisms described herein can present a virtual boundary in an extended reality scene of an environment of a marine vessel, which can assist an operator in understanding when objects in the environment are within a particular distance of the marine vessel being operated, as it may be difficult to accurately judge distance in some marine environments.

Additionally or alternatively, in some embodiments, mechanisms described herein can present a virtual boundary associated with a portion of an environment and/or one or more objects in the environment. For example, there may be areas of the environment that are restricted (e.g., by a government entity, by an owner of the vessel, etc.), and mechanisms described herein can present a virtual boundary in an extended reality scene that can visually indicate a portion of the environment that is restricted.

Figure 1:
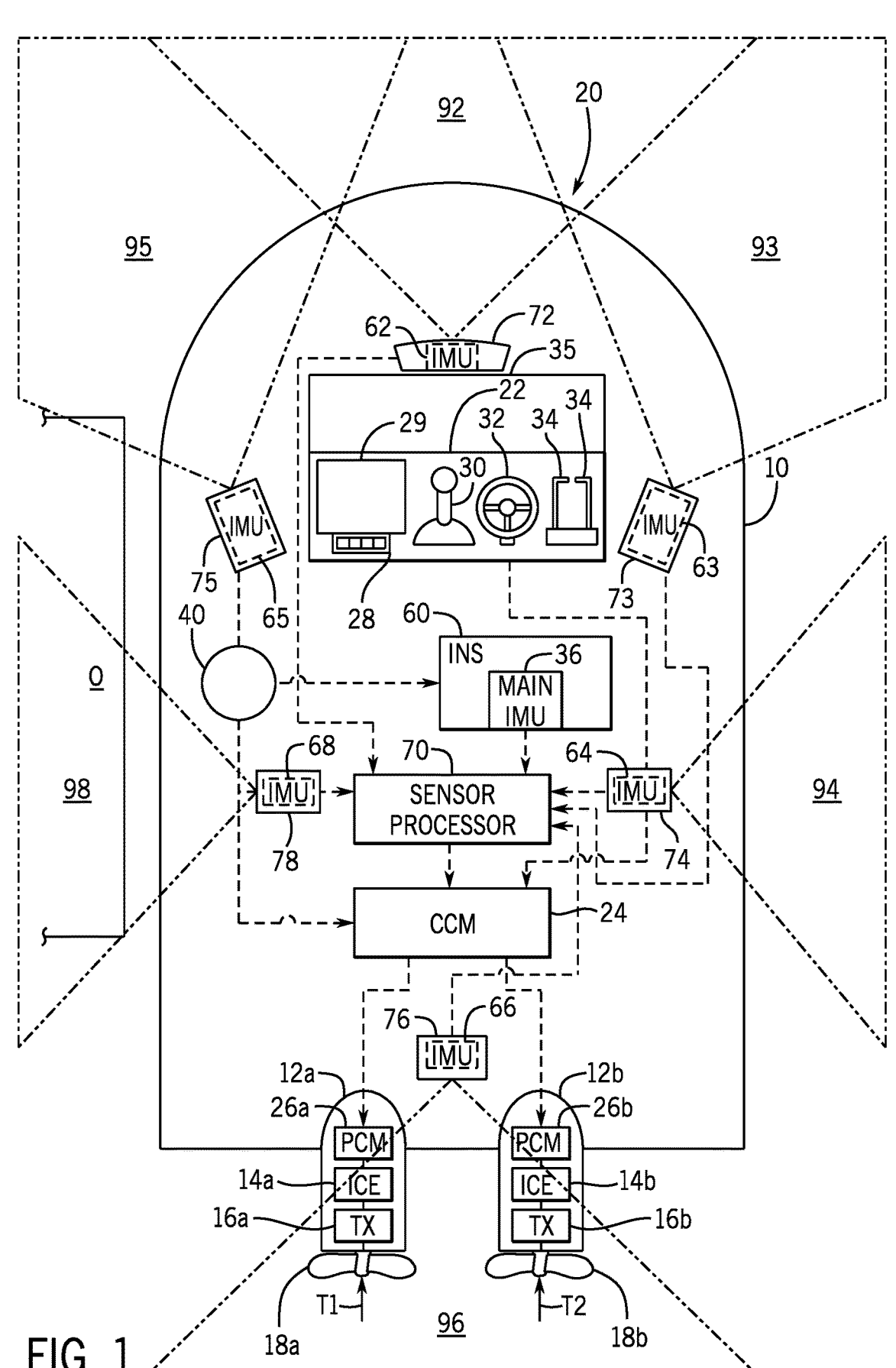
FIG. 1 shows an example of a propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as for example a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as vessel measurement functions and/or calibration monitoring functions, as described in detail below.

Note that although mechanisms described herein are generally described in connection with an internal combustion engine (ICE) propulsion system that includes a powerhead implemented using an ICE engine, mechanisms described herein can be used in connection with a propulsion system that includes any other suitable powerhead, such as one or more electric motors, or any suitable combination of powerheads. For example, propulsion devices 12a, 12b can be replaced by, or used in combination with, one or more propulsion devices that produce thrust to propel vessel 10 using an electric motor, such as an electric outboard motor, electric inboard motor, electric stern drive, electric jet drive, electric pod drive, any other suitable propulsion device, or combinations thereof, that is implemented using an electric motor (e.g., including a motor that is directly connected to a propulsor shaft without a transmission, such as transmission 16a, 16b).

In some embodiments, operation console 22 can include any suitable number of user input devices, such as, a keypad 28, a joystick 30, a steering wheel 32, one or more throttle/shift levers 34, etc., and any suitable number of output devices, such as a display 29, a heads-up display (HUD) 35, one or more speakers (not shown), etc. In some embodiments, each of the input devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, output devices, such as display 29, HUD 35, speakers, etc., can be configured to present (e.g., visually, audibly, etc.) any suitable data, information, image data (e.g., images captured by one or more devices that include an image sensor(s)), received from controller 24, from another controller or processor, and/or generated based on data and/or information received from controller 24, another controller, and/or processor. In some embodiments, display 29 can be any suitable display, such as a multi-function display (MFD). In some embodiments, display 29 can be used to present a user interface, which can be implemented as a touchscreen or display that is capable of receiving input via a touchscreen. In some embodiments, one or more other input devices can be used to interact with a user interface (e.g., a graphical user interface) presented by display 29, such as a keypad (e.g., keypad 28), a keyboard, a track ball, a track pad, any other suitable user input device, and/or suitable combination of user input devices. In some embodiments, vessel 10 can include multiple displays 29, which can be integrated into operation console 22, integrated into another portion of vessel 10, and/or mechanically mounted to operation console 22 or another portion of vessel 10. In some embodiments, display 29 can be used to present menus, operational data (e.g., throttle, speed, heading, engine output, etc.), maps, charts, settings that can be used to configure another display (e.g., HUD 35), etc.

In some embodiments, HUD 35 can be any suitable display device which can present both a user interface (e.g., on a side of HUD facing toward operation console) and a view of an environment that could be seen if the HUD was not there. For example, HUD 35 can be implemented to project information onto a windshield of vessel 10, through which a portion of an environment of vessel 10 can be observed (and/or portions of vessel 10 itself). As another example, HUD 35 can be integrated into a windshield of vessel 10 (e.g., using a transparent display technology, such as organic light emitting diode (OLED) technology) through which a portion of an environment of vessel 10 can be observed (and/or portions of vessel 10 itself), and which can be used to present a user interface. In some embodiments, HUD 35 can be implemented using a techniques presently known in the art, such as those used in aircraft. In some embodiments, display 29 and/or HUD 35 can be omitted. For example, vessel 10 can include only MFDs (e.g., display 29) or only a HUD (e.g., HUD 35), or both can be omitted (e.g., where a mobile device, such as a tablet computer, laptop computer, head-mounted display, etc. is configured to present a user interface of vessel 10).

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides of vessel 10, and two positioned at an angle between the bow and sides), fewer or more sensors can be provided at each location and/or provided at other locations, such as on a hardtop of vessel 10. In some embodiments, depth sensors 72-78 can be used to determine a three-dimensional location of an object and/or other feature of an environment (e.g., a water surface) that is within a field of view (e.g., partial FOVs 92, 93, 94, 95, 96, and 98 shown in FIG. 1, associated with depth sensors 72, 73, 74, 75, 76, and 78 respectively) of the depth sensor with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. Additionally, in some embodiments, a 3D location of points of vessel 10 that fall within a sensor FOV can be determined (e.g., by sensor processor 70) using the location of points on vessel 10 determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/ or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensor's FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 (and/or any other suitable processor) can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1, and as described below in connection with FIG. 2). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position), integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.), can be translated to a common reference frame (the global coordinate system associated with the vessel). To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however, such information is generally difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electromechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system (e.g., a global navigation satellite system (GNSS)), such as the global positioning system (GPS). GPS receiver 40 can be located at a pre-selected fixed position on vessel 10, which provides information related to a position of vessel 10 with respect to a geographic and/or planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, mechanisms described herein can be configured to use information from one or more of depth sensor 72-78 to present an extended reality (e.g., augmented reality, mixed reality, or virtual reality) scene that includes a virtual boundary that an operator and/or occupant of vessel 10 can view as a navigational and/or safety aid. For example, as described below in connection with FIGS. 4, 5A1, 5A2, 6, 7, 11, and 12, a virtual boundary or multiple virtual boundaries can be rendered and overlayed on an image(s) captured by a depth sensor (e.g., one or more of depth sensor 72-78), which can be presented as an extended reality (XR) scene using display 29. In such an example, a position and orientation of the virtual boundary with respect to vessel 10 can be used to determine a position, orientation, size, and view at which to present the virtual boundary in the XR scene is presented within the image data (e.g., based on a transform between the global coordinate system and the camera coordinate system).

As another example, as described below in connection with FIGS. 4, 5B, 6, and 8, a virtual boundary can be rendered by, and presented using, a mobile extended reality device (e.g., a smartphone, a tablet computer, a head-mounted display (HMD) with a transparent display or a non-transparent display, etc.) overlayed on a view of the environment (e.g., a view observed through a transparent display, or a view included in image data captured by a camera(s) of the mobile extended reality device) as part of an XR scene. In such an example, a position and orientation of the virtual boundary in the XR scene with respect to vessel 10 can be determined based on a position of vessel 10 (e.g., one or more anchor points on vessel 10) and/or a position of one or more anchor points in an environment of vessel 10 (e.g., a static point(s) in the environment).

As yet another example, as described below in connection with FIGS. 4, 5C, 6, and 9, a virtual boundary can be rendered and overlayed on a view of the environment (e.g., a view observed through a transparent HUD, or a view included in image data captured by a camera(s) of vessel 10 configured to capture image data used to present a HUD-like display using a non-transparent display device) as part of an XR scene presented by a HUD (e.g., HUD 35). In such an example, a position and orientation of the virtual boundary in the XR scene with respect to vessel 10 can be determined based on a position of vessel 10 and a perspective from which the XR scene is being viewed by a user.

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed connection lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 36, and/or generate image data (e.g., which can be used to present a portion of an XR scene). As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU) and provide the interpreted IMU data to one or more other processing devices or controllers for execution of subsequent processing steps.

In some embodiments, sensor processor 70 can be programmed and/or otherwise configured to automatically perform an XR presentation process, in which sensor processor 70 can render an image of a virtual boundary based on the position and orientation of the virtual boundary, and cause the rendered image of the virtual boundary to be presented overlayed on a view of an environment of marine vessel 10 (e.g., overlayed on image data captured by an image sensor, such as an image sensor included in a depth sensor, presented using a HUD through which the environment can be viewed, etc.). For example, as described below in connection with FIGS. 6, 7, 9, 11, and 12, sensor processor 70 can render a 2D image of a virtual boundary based on the location and orientation of the virtual boundary (e.g., with respect to vessel 10), and based on a perspective from which the XR scene is viewed (e.g., a location and pose of a camera used to capture the image on which the rendered 2D image is overlayed, a perspective of an operator of vessel 10 viewing the XR scene via a HUD, etc.).

Figure 2:
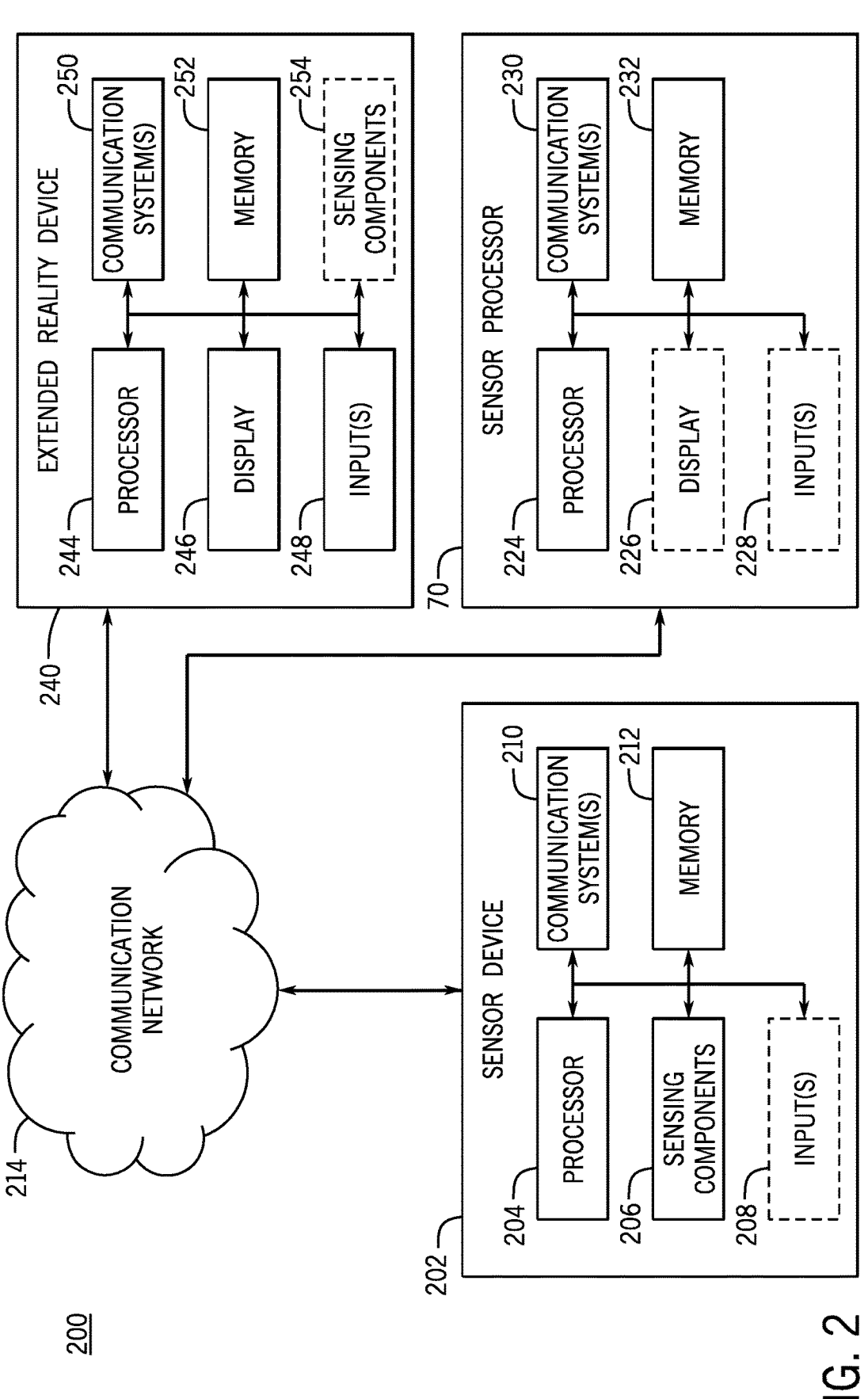
FIG. 2 shows an example of hardware that can be used to implement a sensor device, a sensor processor, and an extended reality device in accordance with some embodiments of the disclosure.

FIG. 2 shows an example of hardware 200 that can be used to implement a sensor device 202 sensor processor 70, and an extended reality device 240 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of sensor device 202, and/or to capture image data of a scene within a field of view of sensor device 202. In some embodiments, sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation). As yet another example, sensor device 202 can be implemented as one or more sound-based devices (e.g., one or more sonar systems, etc.) that include components that facilitate three-dimensional characterization of a region of an environment. As still another example, sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, sensor device 202 can omit inputs (e.g., where depth sensor device is an embedded device, or where depth sensor device is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for presenting one or more virtual boundaries in an XR scene, such as processes described below in connection with FIGS. 6-12, etc.

In some embodiments, depth sensor device 202 can include any suitable display device(s) (not shown), such as a computer monitor, a touchscreen, a television, etc.

In some embodiments, communication network 214 can be any suitable communication network or combination of communication networks. For example, communication network 214 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis, image data, and/or a portion of a user interface to CCM 24, and CCM 24 can use the results, image data, and/or user interface to present one or more virtual boundaries in an XR scene.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze image data and/or depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, etc. In some embodiments, memory 232 can have encoded thereon a computer program for controlling operation of sensor processor 70. In such embodiments, processor 224 can render a 2D image of a virtual boundary based on the location and orientation of the object, and a viewpoint from which the virtual boundary is expected to be viewed, analyze depth information to identify and/or classify one or more objects and/or other features in a scene based on the depth information and/or image information, to receive information from sensor device 202, to execute at least a portion of a process for presenting one or more virtual boundaries in an XR scene, such as processes described below in connection with FIGS. 6-12, etc.

In some embodiments, extended reality device 240 can include a processor 244, a display 246, one or more inputs 248, one or more communications systems 250, memory 252, and/or sensing components 254. In some embodiments, processor 224 can be any suitable hardware processor or combination of processors, such as a CPU, an APU, a GPU, an FPGA, an ASIC, etc.

In some embodiments, display 246 can include any suitable display device(s), such as a transparent display or a non-transparent display (e.g., as described below in connection with FIG. 3). For example, in some embodiments, display 246 can be a transparent display of a head-mounted device (HMD) configured to present XR scenes, such as augmented reality and/or mixed reality scenes. As another example, display 246 can be a non-transparent display of an HMD configured to present XR scenes, such as augmented reality scenes, mixed reality scenes, and/or virtual reality scenes. In such an example, the HMD can be configured as a passthrough device which presents video of the physical environment of a wearer, and virtual content overlaid on the video of the physical environment. As yet another example, display 246 can be a transparent display of a HUD, such as HUD 35. As still another example, display 246 can be a non-transparent display of vessel 10 (e.g., display 29) or a non-transparent display of a mobile computing device (e.g., a smartphone, a tablet computer, etc.).

In some embodiments, inputs 248 can include any suitable input device(s) and/or sensor(s) that can be used to receive user input, such as a gaze tracking system, a head tracking system, motion sensors, a microphone, a keyboard, a mouse, a touchscreen, etc.

In some embodiments, extended reality device 240 can omit inputs (e.g., where extended reality device 240 operates as an output for another device, such as sensor processor 70, CCM 24, etc.; or where extended reality device 240 is an embedded device that is not configured for direct user interaction). For example, extended reality device 240 can receive image data to present from sensor processor 70.

In some embodiments, communications systems 250 can include any suitable hardware, firmware, and/or software for communicating information over communication network 214 and/or any other suitable communication networks. For example, communications systems 250 can include one or more transceivers, one or more communication chips and/or chip sets, etc., that can be used to establish a wired and/or wireless communication link. In a more particular example, communications systems 250 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 252 can include any suitable storage device or devices that can be used to store instructions, values, etc., that can be used, for example, by processor 244 to generate an XR scene, render a virtual object, determine movement of extended reality device 240, identify one or more anchor points in an XR scene, determine where in an XR scene to present a virtual object based on the position of one or more anchor points, determine a position of extended reality device 240, to communicate with sensor processor 70 and/or sensor device 202 via communications system(s) 250, etc. Memory 252 can include any suitable volatile memory, non-volatile memory, storage, or any suitable combination thereof. For example, memory 252 can include RAM, ROM, EEPROM, one or more flash drives, one or more hard disks, one or more solid state drives, one or more optical drives, etc. In some embodiments, memory 252 can have encoded thereon a computer program for controlling operation of extended reality device 240. In such embodiments, processor 244 can render a 2D image of a virtual boundary based on the location and orientation of the boundary, and based a viewpoint from which the virtual boundary is expected to be viewed, analyze depth information to identify and/or classify one or more objects and/or other features in a scene based on the depth information and/or image information, to identify one or more anchor points, to present the rendered virtual boundary at a position within the XR scene, to receive information from sensor device 202, to receive information from sensor processor 70, to execute at least a portion of a process for presenting one or more virtual boundaries in an XR scene, such as processes described below in connection with FIGS. 6-12, etc. In some embodiments, extended reality device 240 can use any suitable hardware and/or software for rendering content, such as any suitable rendering pipeline (e.g. using polygon rendering techniques, raytracing rendering techniques, etc., such as UNITY 3D available from UNITY TECHNOLOGIES, UNREAL ENGINE available from EPIC GAMES, etc.). Additionally, in some embodiments, any suitable communications protocol(s) can be used to communicate control data, image data, audio, etc., between extended reality device 240 and any other device (e.g., sensor processor 70, sensor device 202, controller 24, etc.).

In some embodiments, sensing components 254 can include components that are used to determine a three-dimensional location of an object and/or other feature of an environment (e.g., a water surface) that is within a field of view of one or more cameras and/or other sensors of extended reality device 240, and/or to capture image data of a scene within a field of view of one or more cameras of extended reality device 240.

In some embodiments, extended reality device 240 can include components used to implement one or more of depth sensors 72-78. For example, sensing components 254 of extended reality device 240 can include one or more cameras that include components that facilitate three-dimensional imaging of a region of an environment, such as a stereoscopic camera, a structured light camera, a continuous-wave time-of-flight camera, a direct time-of-flight camera, etc. As another example, sensing components 254 of extended reality device 240 can include one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation).

Figure 3:
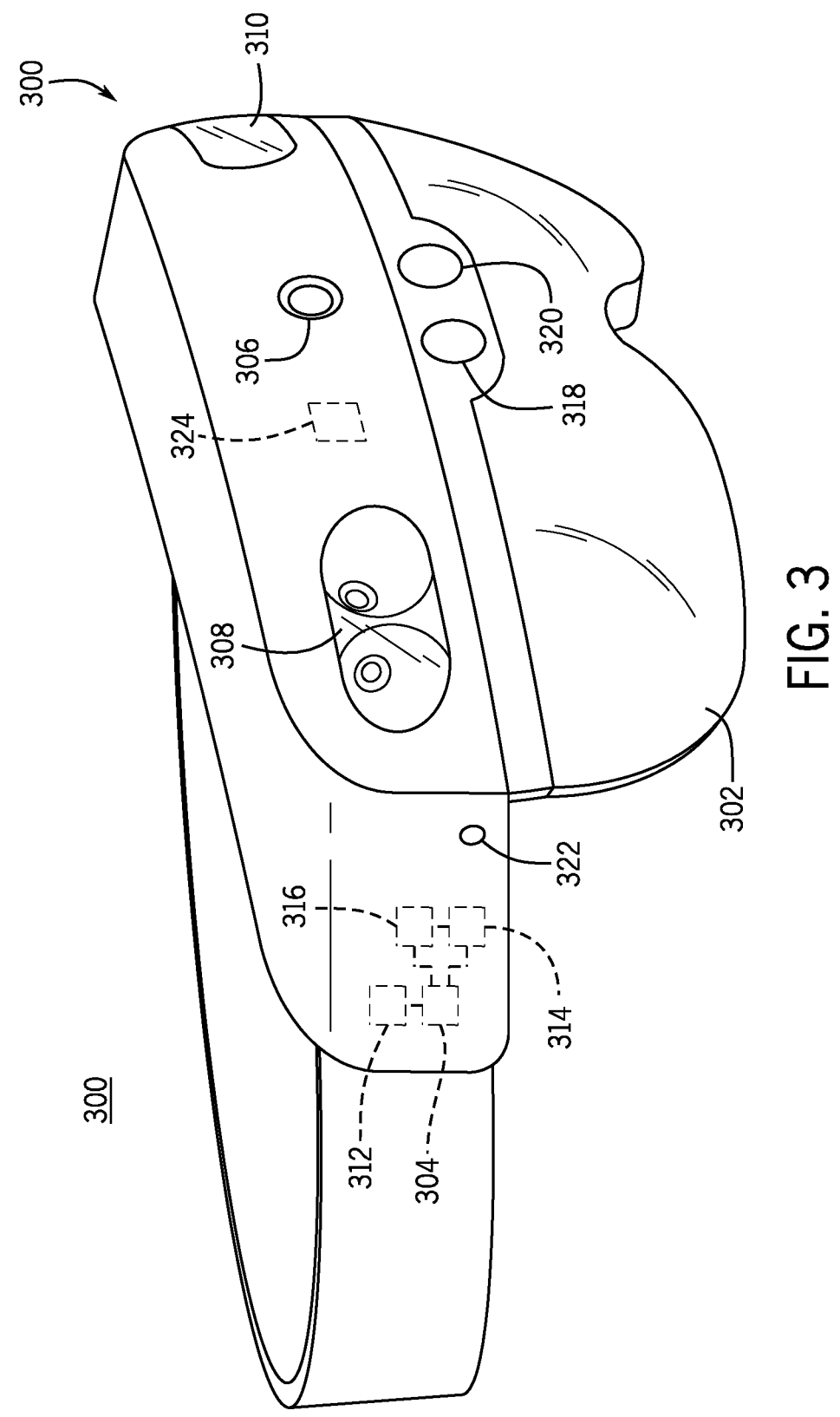
FIG. 3 shows an example of an extended reality device that can be used to present an extended reality scene in accordance with some embodiments of the disclosure.

FIG. 3 shows an example of an extended reality device 300 that can be used to present an extended reality scene in accordance with some embodiments of the disclosure. As shown in FIG. 3, extended reality (XR) device 300 can be implemented as a head mounted display (HMD), which can include a display processor 304 and a display 302 that can be used to present images, such as virtual objects (sometimes referred to as holographic objects in augmented reality and mixed reality scenes), to the eyes of a wearer of XR device 300. In some embodiments, display 302 can be configured to visually augment an appearance of a physical environment to a wearer viewing the physical environment via display 302. For example, in some embodiments, the appearance of the physical environment can be augmented by graphical content (e.g., one or more pixels each having a respective color and brightness) that is presented via display 302 implemented as a transparent display to create a mixed reality (or augmented reality environment). Note that as used herein, mixed reality and augmented reality are meant to convey similar experiences, but a mixed reality environment may convey a more immersive environment than an augmented reality environment. Additionally or alternatively, in some embodiments, display 302 can be configured to render a fully opaque virtual environment (e.g., by using one or more techniques to block the physical environment from being visible through XR device 300). In some embodiments, a non-transparent display can be used in lieu of a transparent display as display 302. In some such embodiments, one or more cameras can be used to generate a real-time representation of at least a portion of the physical environment in which XR device 300 is located. For example, an HMD with a non-transparent display can simulate a mixed reality environment using images of a physical environment and graphics (e.g., 3D models) displayed with the images of the physical environment as though the graphics are physically present within the physical environment. In some such embodiments, XR device 300 can be used to present a virtual reality environment. In some such embodiments, the virtual reality environment can include a fully virtual environment. Alternatively, in some such embodiments, the virtual reality environment can be used to present an augmented reality or mixed reality scene via pass-through virtual reality techniques. For example, one or more cameras, such as a camera 306, a stereo camera 308, and/or a stereo camera 310 can be used to capture image data representing a physical environment around a user of XR device 300, and can present image data representing the physical environment around the user of XR device 300 using a non-transparent display (e.g., with virtual objects overlaid with the image data to present an augmented reality or mixed reality scene). As described above, the term extended reality is sometimes used herein to refer to technologies that facilitate an immersive experience, including augmented reality, mixed reality, and virtual reality.

As shown in FIG. 3, in some embodiments, display 302 can include one or more image producing elements (e.g., display pixels) located within lenses of display 302 (such as, for example, pixels of a see-through Organic Light-Emitting Diode (OLED) display). Additionally or alternatively, in some embodiments, display 302 can include a light modulator on an edge of the lenses.

In some embodiments, XR device 300 can include various sensors and/or other related systems. For example, XR device 300 can include a gaze tracking system 312 that can include one or more image sensors (e.g., with a field of view that includes one or more eyes of a wearer of XR device 300) that can generate gaze tracking data that represents a gaze direction of a wearer's eyes. In some embodiments, gaze tracking system 312 can include any suitable number and arrangement of light sources and/or image sensors. For example, gaze tracking system 312 of XR device 300 can utilize at least one inward facing sensor. In some embodiments, a wearer of XR device 300 can be prompted to permit the acquisition and use of gaze information to track a position and/or movement of the user's eyes.

In some embodiments, XR device 300 can include a head tracking system 314 that can utilize one or more motion sensors, such as motion sensors 316 shown in FIG. 3 (e.g., including one or more components of an IMU, as described above in connection with main IMU 36 and/or IMUs 62-68 of FIG. 1), to capture head pose data that can be used to track a head position of the wearer, for example, by determining the direction and/or orientation of the wearer's head. For example, in some embodiments, head tracking system 314 can include an inertial measurement unit configured as a three-axis and/or three-degree of freedom position sensor system.

In some embodiments, head tracking system 314 can also support other suitable positioning techniques, such as Global Positioning System (GPS) or other global navigation systems, indoor position tracking systems (e.g., using Bluetooth low energy beacons), etc. Further, while specific examples of position sensor systems have been described, any other suitable position sensor system(s) or any suitable combination of position sensor systems can be used. For example, head pose and/or movement data can be determined based on sensor information from any suitable combination of sensors mounted on the wearer (e.g., via XR device 300 or another device) and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., Wi-Fi antennas/interfaces, Bluetooth, etc.), etc.

In some embodiments, XR device 300 can include an optical sensor system that can utilize one or more outward facing sensors, such as camera 306, stereoscopic cameras 308 and/or 310, a depth camera 318 and associated light source 320, to capture image data of the environment. In some embodiments, the captured image data can be used to detect movements captured in the image data, such as gesture-based inputs and/or any other suitable movements by a user wearing XR device 300, by another person in the field of view of one or more components of the optical sensor system, or by a physical object within the field of view of one or more components of the optical sensor system.

In some embodiments, depth camera 318 can be an active depth camera that utilizes light source 320, such as a structured light camera, a continuous-wave time-of-flight camera, a direct time-of-flight camera, etc. In such examples, light source 320 can be configured to output light in any suitable temporal and/or spatial pattern suitable to facilitate depth imaging via structured light techniques, continuous-wave time-of-flight techniques, direct time-of-flight techniques, etc. In some embodiments, light source 320 can emit non-visible light (e.g., infrared light). Additionally or alternatively, in some embodiments, stereoscopic cameras 308 and/or 310 can be passive depth cameras that utilize ambient light and/or light from light source 320 to capture image data and/or generate depth information.

Additionally, in some embodiments, one or more outward facing sensor(s) of the optical sensor system can capture 2D image information and/or depth information from the physical environment and/or physical objects within the environment. For example, the outward facing sensor(s) can include a depth camera (e.g., depth camera 318), a visible light camera (e.g., having a CMOS or CCD sensor, a color filter array, etc.), an infrared light camera, a position tracking camera, and/or any other suitable image sensor or combination of image sensors.

In some embodiments, XR device 300 can include a microphone system that can include one or more microphones, such as microphone 322, that can capture audio data. In some embodiments, audio can be presented to the wearer via one or more speakers (not shown).

In some embodiments, XR device 300 can include a controller 324, which can include any suitable processor (e.g., a separate controller can be omitted, and processor 304, which can be implemented using processor 244, can operate as a controller for XR device 300, or controller 324 can be implemented by another processor(s), such as a processor described above in connection with processor 244), and memory (e.g., memory 252) that are in communication with the various sensors and systems of XR device 300. In some embodiments, controller 324 can store, in memory, instructions that are executable by the processor(s) to receive signal inputs from the sensors, determine a pose of XR device 300, and adjust display properties for content displayed using display 302.

In some embodiments, XR device 300 can have any other suitable features or combination of features, such as features incorporated into the HOLOLENS and HOLOLENS 2 from MICROSOFT CORP., MAGICLEAP 2 from MAGIC LEAP, INC., APPLE VISION PRO from APPLE, INC., BLADE 2 SMARTGLASSES from VUZIX, or any other suitable wearable XR device. Note that the description herein of XR device 300 is merely for illustration of hardware that can be used in connection with the disclosed subject matter. However, the disclosed subject matter can be used with any suitable mixed reality device and/or augmented reality device, such as the HOLOLENS and HOLOLENS 2 from MICROSOFT CORP., MAGICLEAP 2 from MAGIC LEAP, INC., APPLE VISION PRO from APPLE, INC., etc.

As described above in connection with FIGS. 1 and 2, in some embodiments, the disclosed subject matter can be used in connection with non-wearable mobile computing devices (e.g., smartphones, tablet computers, etc.) and/or non-mobile devices (e.g., one or more MFDs, a personal computers, laptop computers, etc.). For example, a smartphone can be used to provide a mixed reality and/or augmented reality experience using a camera and display of the smartphone. As another example, a system(s) of vessel 10 can be used to provide a mixed reality and/or augmented reality experience (e.g., using a camera(s), such as depth sensor(s) 72-78, and a display, such as display 29).

Figure 4A:
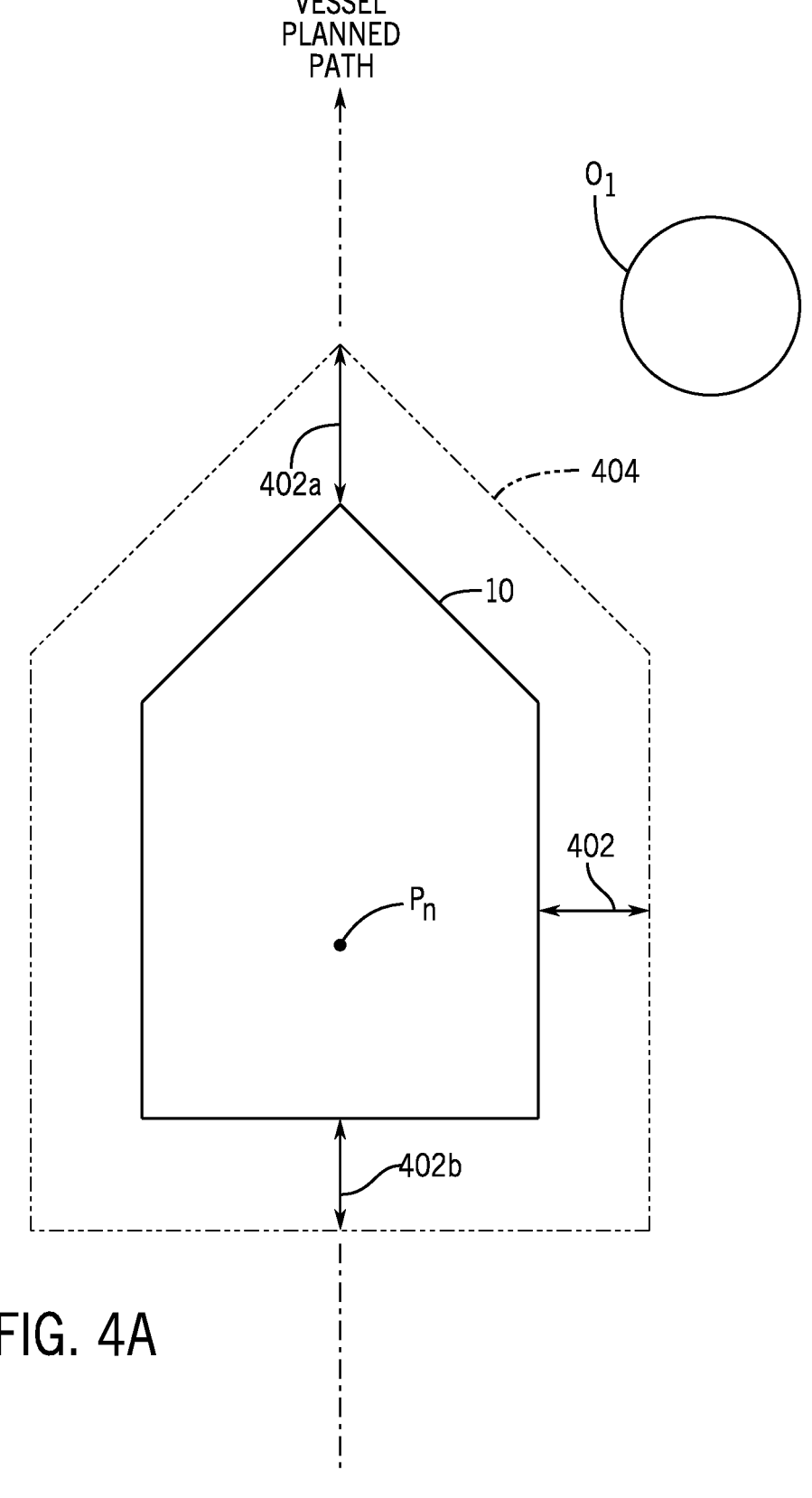
FIG. 4A shows an example of a virtual boundary of a marine vessel that can be visualized in accordance with some embodiments of the disclosed subject matter.

FIG. 4A shows an example of a virtual boundary of a marine vessel that can be visualized in accordance with some embodiments of the disclosed subject matter. In FIG. 4A, the virtual boundary can represent a buffer distance that can be maintained between a marine vessel and an object. In the example in FIG. 4A, marine vessel 10 can be configured to maintain at least a predetermined buffer distance 402 from any objects (e.g., object O). A buffer zone 404 can be defined around marine vessel 10, and velocity limits can be calculated in order to progressively decrease the vessel velocity as it approaches a preset buffer distance 402 from object O. In some embodiments, buffer zone 404 can be established at a preset buffer distance 402 that is equal around all sides of the marine vessel, as shown in FIG. 4A. Alternatively, in some embodiments, buffer zone 404 can be asymmetrical with respect to the marine vessel, such as to provide a greater buffer distance 402a at the front side of the marine vessel than a buffer distance 402b on the rear side of the marine vessel. Similarly, a buffer distance on the starboard and port sides of marine vessel 10 may be set the same or different than front and rear buffer distances 402a, 402b.

In some embodiments, a two-dimensional vessel outline and/or buffer area 404 can be represented as a set of Cartesian points defined with respect to a point of navigation $P_n$ (e.g., a COG or COR). For example, the two-dimensional vessel outline may be a set of five points forming the shape of a pentagon around $P_n$, where a center point is the navigation point $P_n$ of the marine vessel.

In some embodiments, during autonomous or semi-autonomous control of vessel 10 (e.g., as effectuated by controller 24), buffer area 404 can be used to determine whether any objects (e.g., object $O_1$) are in a planned path of vessel 10, and control propulsion of vessel 10 to avoid colliding with the object(s).

In some embodiments, the controller(s) can use any suitable information about the environment to determine a relationship between vessel 10, buffer area 404, and one or more objects in the environment. For example, the controller(s) can use an occupancy grid that has been generated and/or updated using proximity information measured by environmental sensors (e.g., depth sensors 72-78). In some embodiments, the occupancy grid can be formatted as a data structure in which each element corresponds to a cell of the occupancy grid, and each element is indicative of a probability that the cell is occupied by an object/obstacle. In some embodiments, each cell can represent a volume of the environment (e.g., having a width, depth, and height). For example, each cell can represent a volume that is 0.25 meters (m) by 0.25 m laterally, and extends from a water surface to a height at or above the top of vessel 10 (e.g., 3 m from the water's surface, 5 m from the water surface, etc.). In some embodiments, vessel 10 can gather location information corresponding to objects in the environment during operation (e.g., using depth sensors 72-78), and can generate a model (e.g., using a point cloud) of objects in an environment around vessel 10 based on the location of the objects. In some embodiments, the controller(s) can update the occupancy grid in real-time based on recent measurements of a portion of the environment within a predetermined range of the proximity sensors(s).

In some embodiments, the occupancy grid can include multiple layers (e.g., each cell can be associated with multiple elements) that indicate a probability that the cell is occupied by a particular type of object. For example, each cell can be associated with an element indicative of a probability of any object being present in the cell. As another example, each cell can be associated with an element indicative of a probability of a person being present in the cell. As yet another example, each cell can be associated with an element indicative of a probability of a powered boat being present in the cell. As yet another example, each cell can be associated with an element indicative of a probability of a human-powered vessel (e.g., a kayak, a canoe, a row boat, a paddle boat, a stand-up paddle board, etc.) being present in the cell. As yet another example, each cell can be associated with an element indicative of a probability of a small vessel (e.g., a boat or other powered vessel, such as a jet ski, under a particular size) being present in the cell. As still another example, each cell can be associated with elements indicative of a probability of other types of objects and/or obstructions being present in the cell, such as land, a dock, a structure (e.g., a bridge, a pier, a post, a piling, etc.), vegetation, floating vegetation, miscellaneous debris, floating logs, etc.

In some embodiments, information indicating a probability of an object occupying a cell can be based on any suitable information. For example, location information (e.g., based on measurements by depth sensors 72-78) can be correlated with feature label information that identifies a classification of a feature. In some embodiments, the label information can be generated using any suitable technique or combination of techniques. For example, one or more images of an environment (e.g., color images) can be captured, and can be used to generate segmentation information or object detection information (e.g., using a trained machine learning model), which can include classification information that indicates which of a set of classes different portions of the image are most likely to correspond. In some embodiments, the set of classes can include classes that are relatively likely for the vessel to encounter (e.g., in a marine environment).

Figure 4B:
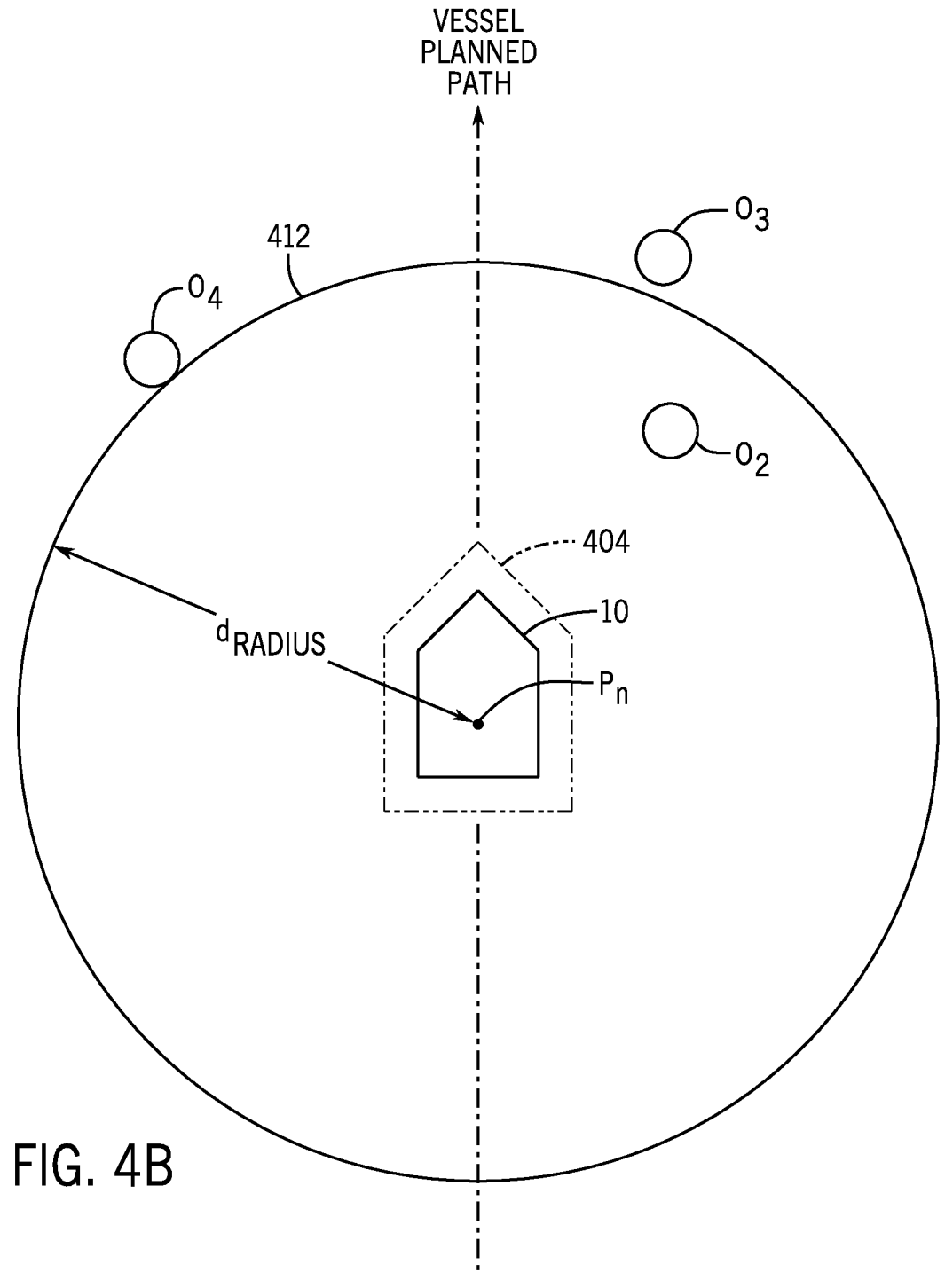
FIG. 4B shows another example of virtual boundaries of a marine vessel that can be visualized in accordance with some embodiments of the disclosed subject matter.

FIG. 4B shows another example of virtual boundaries of a marine vessel that can be visualized in accordance with some embodiments of the disclosed subject matter. In some embodiments, mechanisms described herein can visualize a relatively large boundary area around a vessel (e.g., larger than a buffer area, such as buffer area 404) to determine whether to take an action based on the presence of an object, a particular type of object, and/or a specific area (e.g., an area into which vessel 10 should not be navigated to), such as imposing a lower velocity limit based on objects near the vessel, generating an alert indicating the presence of an object within the virtual boundary, generating an alert indicating that the vessel is approaching a specific type of area, modifying visualization of the virtual boundary based on the presence of an object near and/or within the virtual boundary and/or indicating that the vessel is approaching a specific type of area, etc. Note that a planned path is shown in FIGS. 4A and 4B. In some embodiments, a shape of the virtual boundary can be based on the planned path. Additionally, in some embodiments, virtual boundaries described herein can be implemented while a vessel is not moving, is being manually operated, and/or while there is no planned path.

In some embodiments, a virtual boundary can have any suitable shape, and the shape may depend on a current direction and/or velocity of the vessel. For example, as shown in FIG. 4B, a circular virtual boundary 412 can defined by a radius $d_{radius}$ from a point of navigation $P_n$. In such an example, mechanisms described herein can generate a visualization of virtual boundary 412 that can be included in an XR scene, and may perform one or more actions based on the locations of objects that fall at least partially within virtual boundary 412 (e.g., objects $O_2$, but not object $O_3$ or $O_4$) and/or objects that are near the virtual boundary (e.g., within a threshold distance of virtual boundary 412). In a more particular example, mechanisms described herein can utilize information about which cells of an occupancy grid correspond to an area of the environment that falls within virtual boundary 412 and/or within a threshold distance of virtual boundary 412 based on elements associated with those cells. In some embodiments, radius $d_{radius}$ can be any suitable magnitude. For example, $d_{radius}$ can be in a range of about 10 m to about 30 m. Additionally, in some embodiments, radius $d_{radius}$ can vary based on conditions (e.g., based on current velocity; based on a current type of navigation being performed, etc.). For example, as the current velocity increases, the magnitude of radius $d_{radius}$ can increase. As another example, in a navigation mode associated with docking, a relatively small radius can be used, and in a navigation mode associated with point-to-point navigation a larger radius can be used.

As another example, an elongate local consideration zone can defined by multiple parameters, such as a lateral distance $d_{lateral}$ from a point of navigation $P_n$ and/or a planned path of the vessel, and front distance $d_{ahead}$ that extends from a point of navigation $P_n$ in a fore direction, and a mechanisms described herein can generate a visualization of virtual boundary 412 that can be included in an XR scene, and may perform one or more actions based on the locations of objects that fall at least partially within the virtual boundary and/or objects that are near the virtual boundary. In some embodiments, $d_{lateral}$, $d_{behind}$, and $d_{ahead}$ can be any suitable magnitude. For example, $d_{lateral}$ can be in a range of about 5 m to about 15 m, $d_{behind}$ can be in a range of about 5 m to about 15 m, and $d_{ahead}$ can be in a range of about 10 m to about 30 m. Additionally, in some embodiments, $d_{lateral}$, $d_{behind}$, and $d_{ahead}$ can vary based on conditions (e.g., based on current velocity; based on a current type of navigation being performed, etc.). For example, as the current velocity increases, the magnitude of each of $d_{lateral}$, $d_{behind}$, and $d_{ahead}$ can increase. As another example, in a navigation mode associated with docking, relatively small values for $d_{lateral}$, $d_{behind}$, and $d_{ahead}$ can be used, and in a navigation mode associated with point-to-point navigation larger values for $d_{lateral}$, $d_{behind}$, and $d_{ahead}$. In some embodiments, values of $d_{lateral}$, $d_{behind}$, and $d_{ahead}$ can change based on a direction of travel. For example, if vessel 10 is traveling in reverse, $d_{behind}$ can be greater than $d_{ahead}$. As another example, if vessel 10 is traveling laterally a value of $d_{lateral}$ on a side corresponding to a direction of travel can be greater than $d_{lateral}$ on a side opposite to a direction of travel.

As yet another example, a virtual boundary can have an ellipse shape. In a more particular example, the ellipse can be drawn to have vessel 10 at one focus (e.g., with the other focus being forward of vessel 10). As another more particular example, the ellipse can be drawn to have vessel 10 at a center of the ellipse.

As still another example, a virtual boundary can have a complex shape, such as a multi-lobed shape, e.g., three overlapping ellipses with vessel 10 at a first focus of each ellipse, and each ellipse can have a second focus forward of vessel 10, offset by a predetermined angle.

FIG. 5A1 shows an example of an extended reality scene 500 that includes a non-virtual marine vessel and a virtual boundary being presented by a two-dimensional display of the marine vessel in accordance with some embodiments of the disclosure. As shown in FIG. 5A, a two-dimensional display device, such as an MFD (e.g., display 29 in the example shown in FIG. 4A) can present XR scene 500, which includes a portion of vessel 10, and a virtual boundary 504. As described above in connection with FIG. 1, and below in connection with FIGS. 6, 7, 11 and 12, an image of virtual boundary 504 can be rendered based on a position and orientation of virtual boundary 504 with respect to a camera (e.g., a camera of a depth sensor, such as one of depth sensors 72-78) used to capture image data used to generate an image that makes up a portion of XR scene 500.

In some embodiments, mechanisms described herein can use a portion(s) of vessel 10 as a reference point(s) to determine a location and orientation of virtual boundary 504 within the image. In some such embodiments, a size and orientation of virtual boundary 504 may be based on a position and orientation of vessel 10 with respect to the camera capturing the image used to generate XR scene 500. For example, in some embodiments, mechanisms described herein can use a position of one or more points on a hull of vessel 10 to determine a placement of one or more points of virtual boundary 504, and can render virtual boundary 504 in a position relative to the hull. In such an example, an initial location and orientation of virtual boundary 504 can be determined with respect to an anchor point(s) (e.g., in a coordinate system associated with vessel 10, such as a global coordinate system; or in a coordinate system associated with the depth sensor, such as a camera coordinate system). An initial location and orientation of the virtual boundary can be determined based on the size and shape of the virtual boundary to be visualized. In some embodiments, a user can provide input (e.g., via a touchscreen, via a keypad, etc.) indicating a placement for the virtual boundary(s). In some embodiments, mechanisms described herein can render a virtual boundary such that it maintains a predetermined relationship to a water surface 508. For example, mechanisms described herein can render virtual boundary 504 such that it appears to be on water surface 508 at a predetermined distance(s) from vessel 10. As another example, mechanisms described herein can render virtual boundary 504 such that it appears to be perpendicular to water surface 508 at a predetermined distance(s) from vessel 10.

Additionally or alternatively, in some embodiments, mechanisms described herein can use a relatively static portion(s) of the environment, such as dock 506, as an anchor point (sometimes referred to as a spatial anchor) to determine a position and orientation of virtual boundary 504. For example, mechanisms described herein can use one or more anchor points in the environment, such as a particular portion of dock 506, as an anchor point, and can render virtual boundary 504 and/or one or more additional virtual objects in a position relative to the anchor point(s). In such an example, an initial location and orientation of the virtual boundary can be determined with respect to an anchor point (e.g., in a coordinate system associated with the anchor point; in a coordinate system associated with vessel 10, such as a global coordinate system; or in a coordinate system associated with the depth sensor, such as a camera coordinate system). An initial location and orientation of virtual boundary 504 can be determined in a coordinate system associated with an anchor point based on the size and orientation of the virtual boundary and the position of vessel 10.

In some embodiments, a portion of virtual boundary 504 that intersects an object, is near an object (e.g., within a threshold distance), or that is closest to an object within the boundary can be visualized in a different style, which can highlight the presence of the object. For example, a portion 504a of virtual boundary 504 can be presented in a different color, with different line weights, blinking, with a different shape (e.g., based on an outline of the object intersecting virtual boundary 504), etc., or any suitable combination of different styles. Additionally or alternatively, in some embodiments, an additional virtual object can be presented indicating the presence of an object(s) intersecting the boundary, within the boundary, or near/approaching the boundary. For example, a user interface element 504b can be included in XR scene 500 which can highlight the presence of the object(s). In the example of FIG. 5A1, user interface element 504b is shown as a series of arcs between vessel 10 and the object (e.g., dock 506), but any suitable user interface element can be used, such as an arrow(s), an outline of the object within, intersecting, or near virtual boundary, etc.

In the examples shown in FIGS. 5A1 to 5C, a virtual boundary that is relatively large is shown (e.g., based on virtual boundary 412). Although not shown in FIGS. 5A1 to

5C, mechanisms described herein can visualize a virtual boundary based on a buffer zone (e.g., buffer zone 404) in addition to, or in lieu of, virtual boundary 504. For example, similar techniques to those described herein in connection with virtual boundary 504 can be used to present a virtual boundary based on a buffer zone that is positioned closer to vessel 10.

FIG. 5A2 shows an example of an extended reality scene 510 that includes a non-virtual marine vessel and a virtual boundary being presented by a two-dimensional display of the marine vessel in accordance with some embodiments of the disclosure. In scene 510 a virtual boundary 514 is visualized at a similar location and orientation as virtual boundary 504, but is visualized in a different style, as a transparent gride extending up from water surface 508, rather than being presented on water surface 508.

In some embodiments, virtual boundary shown in FIGS. 5A1 and 5A2 can be rendered with any suitable degree of transparency. For example, virtual boundary (e.g., 504 as shown in FIG. 5A1) can be rendered as an opaque object in the XR scene (e.g., it can cover portions of the XR scene). As another example, virtual boundary (e.g., 504 or 514 as shown in FIGS. 5A1 and 5A2) can be rendered as an at least partially transparent object in the XR scene (e.g., a portion(s) of the XR scene can be seen through the virtual boundary).

Figure 5B:
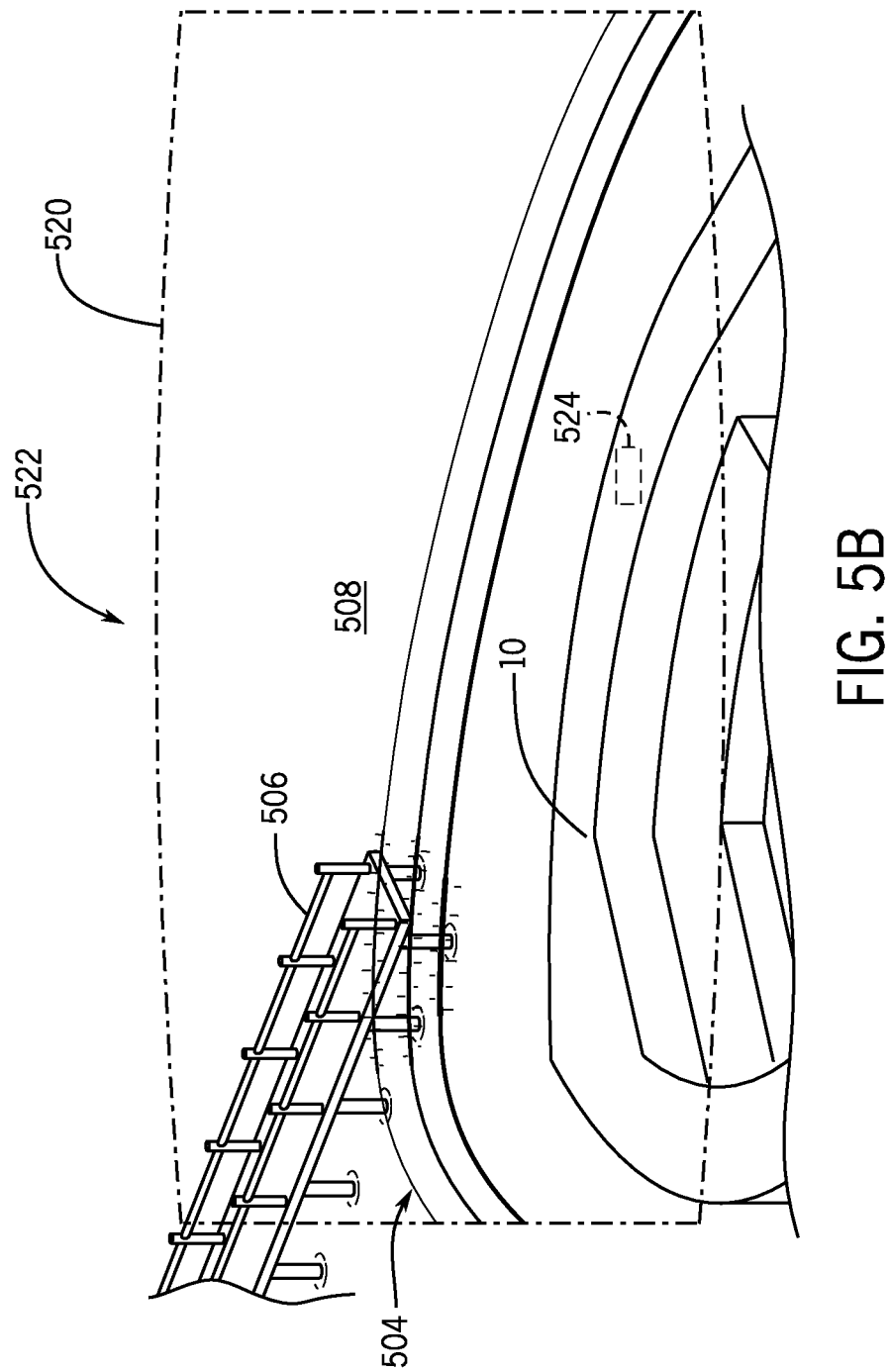
FIG. 5B shows an example of an extended reality scene that includes a non-virtual marine vessel and a virtual boundary being presented by a mobile extended reality device in accordance with some embodiments of the disclosure.

FIG. 5B shows an example of an extended reality scene 520 that includes a non-virtual marine vessel and a virtual boundary being presented by a mobile extended reality device in accordance with some embodiments of the disclosure. As shown in FIG. 5B, a mobile extended reality device, such as an HMD, a smartphone, or a table computer (e.g., extended reality device 240, HMD 300, etc.) can present XR scene 520, which includes a portion of vessel 10, and virtual boundary 504, in environment 522. As described above in connection with FIG. 1, and below in connection with FIGS. 6 and 8, an image of virtual boundary 504 can be rendered based on a position and orientation of virtual boundary 504 with respect to the mobile XR device used to view XR scene 520, and virtual boundary 504 can be presented as part of XR scene 520.

In some embodiments, mechanisms described herein can use a portion(s) of vessel 10 as a reference point(s) to determine a location and orientation of virtual boundary 504 within XR scene 520. In some such embodiments, a size and orientation of virtual boundary 504 may be based on a position and orientation of vessel 10 with respect to the mobile XR device used to generate XR scene 520. For example, in some embodiments, mechanisms described herein can use a position of one or more points on a hull of vessel 10 to determine a placement of one or more points of virtual boundary 504, and can render virtual boundary 504 in a position relative to the hull. In such an example, an initial location and orientation of virtual boundary 504 can be determined based on information received from vessel 10 (e.g., from controller 24, sensor processor 70, etc.) indicating a size and orientation of virtual boundary 504 with respect to an anchor point(s) of vessel 10 (e.g., in a coordinate system associated with vessel 10, such as a global coordinate system; in a coordinate system associated a depth sensor, such as a camera coordinate system; in a coordinate system associated the mobile XR device; or in a more general coordinate system, such as a geographic coordinate system). An initial location and orientation of the virtual boundary can be determined based on the size and shape of the virtual boundary to be visualized. In some embodiments, a user can provide input (e.g., via a touchscreen, via a keypad, etc.) indicating a placement for the virtual boundary (s). In some embodiments, mechanisms described herein can render a virtual boundary such that it maintains a predetermined relationship to a water surface 508. For example, mechanisms described herein can render virtual boundary 504 such that it appears to be on water surface 508 at a predetermined distance(s) from vessel 10. As another example, mechanisms described herein can render virtual boundary 504 such that it appears to be perpendicular to water surface 508 at a predetermined distance(s) from vessel 10.

Additionally or alternatively, in some embodiments, for example as described below, mechanisms described herein can use a relatively static portion(s) of the environment, such as dock 506, as an anchor point. For example, mechanisms described herein can use one or more anchor points in the environment, such as a particular portion of dock 506, as an anchor point, and can render virtual boundary 504 and/or one or more additional virtual objects in a position relative to the anchor point, which can mitigate position errors that may cause virtual boundary 504 to appear to move position with movements of the mobile XR device and/or vessel 10, such that a position of virtual boundary 504 can be maintained with respect to the static anchor point. In such an example, an initial location and orientation of the virtual object can be determined with respect to an anchor point (e.g., in a coordinate system associated with the anchor point). An initial location and orientation of the virtual object can be determined in a coordinate system associated with an anchor point based on a predetermined location and orientation, an input location and orientation (e.g., based on user input, such as an initial viewpoint and/or field of view of the extended reality device), and/or a calculated location and orientation.

Additionally, in some embodiments, mechanisms described herein can use one or more fiducial markers 524 to determine a location and/or pose of the extended reality device with respect to the location of the fiducial marker. In some embodiments, mechanisms described herein can determine a transform between a coordinate system associated with the mobile XR device and a coordinate system associated with vessel 10 (e.g., a global coordinate system). In some embodiments, a known location of the fiducial marker(s) in the coordinate system associated with the vessel can be used to determine the transform between coordinate systems and/or a location and pose of the mobile extended reality device. In some embodiments, fiducial marker 524 can be any suitable object and/or pattern that can be used to determine a distance and angle from which an image of fiducial marker 524 was captured, such as a QR code, or other 2D machine readable code.

In some embodiments, for example as described above in connection with FIG. 5A1, a portion of virtual boundary 504 that intersects an object, is near an object (e.g., within a threshold distance), or that is closest to an object within the boundary can be visualized in a different style, and/or a user interface element (e.g., 504b) can be included in the XR scene in connection with the object(s). Additionally, in some embodiments, virtual boundary can be visualized in various different styles, although only a single style is shown in FIG. 5B (e.g., a style shown in FIG. 5A2, or any other suitable style).

Figure 5C:
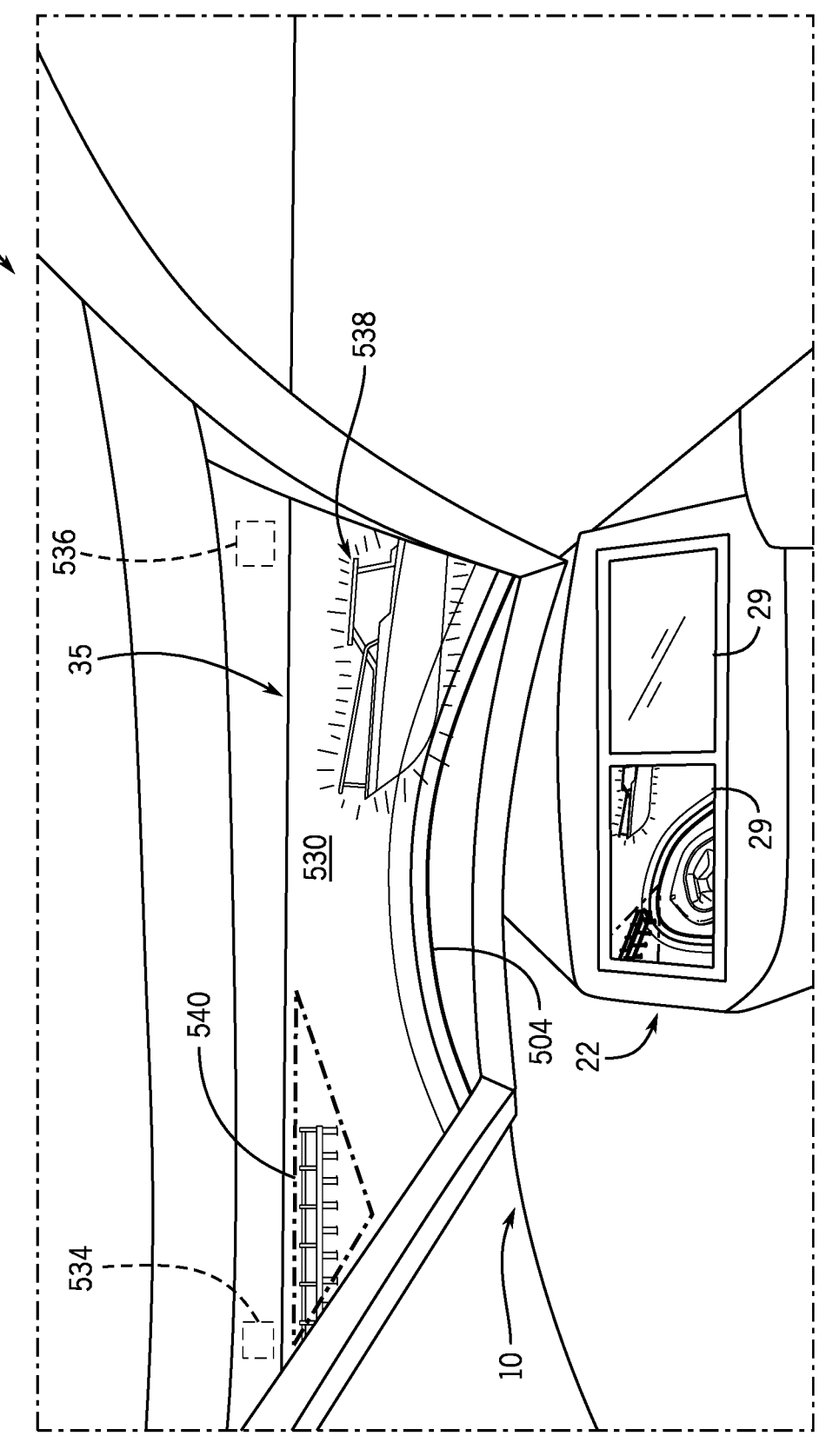
FIG. 5C shows an example of an extended reality scene that includes a non-virtual marine vessel and a virtual boundary being presented by a heads-up display of the marine vessel in accordance with some embodiments of the disclosure.

FIG. 5C shows an example of an extended reality scene 520 that includes a non-virtual marine vessel and a virtual boundary being presented by a heads-up display of the marine vessel in accordance with some embodiments of the disclosure. As shown in FIG. 5C, a HUD (e.g., HUD 35) can present XR scene 530, which includes a portion of vessel 10, and virtual boundary 504, in environment 532. As described above in connection with FIG. 1, and below in connection with FIGS. 6 and 9, an image of virtual boundary 504 can be rendered based on a position and orientation of virtual boundary 504 with respect to HUD 35 and/or a viewpoint of a user, and virtual boundary 504 can be presented as part of XR scene 530.

In some embodiments, mechanisms described herein can use a portion(s) of vessel 10 as a reference point(s) to determine a location and orientation of virtual boundary 504 within XR scene 530. In some such embodiments, a size and orientation of virtual boundary 504 may be based on a position and orientation of vessel 10 with respect to the mobile XR device used to generate XR scene 520. For example, in some embodiments, mechanisms described herein can use a position of one or more points on a hull of vessel 10 to determine a placement of one or more points of virtual boundary 504, and can render virtual boundary 504 in a position relative to the hull. In such an example, an initial location and orientation of virtual boundary 504 can be determined based on information received from vessel 10 (e.g., from controller 24, sensor processor 70, etc.) indicating a size and orientation of virtual boundary 504 with respect to an anchor point(s) of vessel 10 (e.g., in a coordinate system associated with vessel 10, such as a global coordinate system; in a coordinate system associated with HUD 35; in a coordinate system associated a depth sensor, such as a camera coordinate system; or in a more general coordinate system, such as a geographic coordinate system). An initial location and orientation of the virtual boundary can be determined based on the size and shape of the virtual boundary to be visualized. In some embodiments, a user can provide input (e.g., via a touchscreen, via a keypad, etc.) indicating a placement for the virtual boundary(s). In some embodiments, mechanisms described herein can render a virtual boundary such that it maintains a predetermined relationship to a water surface 508. For example, mechanisms described herein can render virtual boundary 504 such that it appears to be on water surface 508 at a predetermined distance(s) from vessel 10. As another example, mechanisms described herein can render virtual boundary 504 such that it appears to be perpendicular to water surface 508 at a predetermined distance(s) from vessel 10.

Additionally or alternatively, in some embodiments, mechanisms described herein can use a relatively static portion(s) of the environment, such as a dock (not shown), as an anchor point (sometimes referred to as a spatial anchor) to determine a position and orientation of virtual boundary 504. For example, mechanisms described herein can use one or more anchor points in the environment, as an anchor point, and can render virtual boundary 504 and/or one or more additional virtual objects in a position relative to the anchor point(s). In such an example, an initial location and orientation of the virtual boundary within HUD 35 can be determined with respect to an anchor point (e.g., in a coordinate system associated with the anchor point; in a coordinate system associated with vessel 10, such as a global coordinate system; in a coordinate system associated with HUD 35; in a coordinate system associated a depth sensor, such as a camera coordinate system; or in a more general coordinate system, such as a geographic coordinate system). An initial location and orientation of virtual boundary 504 can be determined in a coordinate system associated with an anchor point based on the size and orientation of the virtual boundary and the position of vessel 10 with respect to the anchor point.

In some embodiments, for example as described above in connection with FIG. 5A1, a portion of virtual boundary 504 that intersects an object, is near an object (e.g., within a threshold distance), or that is closest to an object within the boundary can be visualized in a different style, and/or a user interface element (e.g., 504b) can be included in the XR scene in connection with the object(s). Additionally, in some embodiments, virtual boundary can be visualized in various different styles, although only a single style is shown in FIG. 5B (e.g., a style shown in FIG. 5A2, or any other suitable style). In some embodiments, objects near, within, or intersecting virtual boundary can be highlighted (e.g., boat 538 can be outlined in a first color as it approaches boundary 504, and can be outlined in another color as it intersects boundary 504, etc.). Additionally, in some embodiments, areas that vessel 10 should avoid (e.g., a dangerous area, an area in which vessels are not permitted, etc.), can be highlighted with a user interface element 540 (e.g., such areas can be masked with a color, shading, etc.). In some embodiments, certain navigation zones (e.g., no wake zones, etc.) can be highlighted with a user interface element, such as shading, masking with a color, etc.

Additionally, in some embodiments, mechanisms described herein can use one or more fiducial markers 534 and/or 536 to determine a location and/or viewpoint of a user viewing the extended reality scene via HUD 35 (e.g., using a head-mounted imaging device to capture fiducial markers 534 and/or 536). In some embodiments, mechanisms described herein can determine a viewing perspective of a user based on a known location of the fiducial marker(s) in the coordinate system associated with the vessel. In some embodiments, fiducial markers 534 and/or 536 can be any suitable object and/or pattern that can be used to determine a distance and angle from which an image of fiducial marker 534 and/or 536 was captured, such as a QR code, or other 2D machine readable code.

Additionally or alternatively, in some embodiments, as shown in FIG. 5C, in some embodiments, one or more additional extended reality scenes can be presented using a display(s) 29 of vessel 10 (e.g., as shown in FIG. 5A1).

FIG. 6 shows an example of a process 600 for presenting one or more virtual boundaries in an extended reality scene that includes a non-virtual marine vessel in accordance with some embodiments of the disclosure.

At 602, process 600 can receive an instruction to add a virtual boundary or boundaries to an extended reality scene. In some embodiments, the instruction can be received from any suitable source, and in any suitable format. For example, in some embodiments, process 600 can receive an instruction to add a virtual boundary to an XR scene via a user interface of a device executing at least a portion of process 600. At 604, process 600 can receive information indicative of a position and orientation of the virtual boundary to be included in the XR scene with respect to the marine vessel and/or an XR device being used to present the XR scene. In some embodiments, the information indicative of a position and orientation of the virtual object(s) can be provided via user input to a user interface. For example, a user can provided input via a touchscreen interface (e.g., of MFD 29, of a mobile device executing at least a portion of process 600, etc.). As another example, a user can provide input via keypad 28, a keyboard, a mouse, etc., configured as an input for a device executing process 600. As yet another example, a user can provide input via a camera(s), such as using hand movements that are captured by the camera and used to manipulate one or more portions of an XR scene. In some embodiments, the information indicative of a position and orientation of the virtual boundary can be received from memory or from another device (e.g., memory of a device executing at least a portion of process 600, a device that provided data used to render the virtual boundary, etc.). For example, a virtual boundary can be associated with a predetermined position and/or orientation with respect to a marine vessel in a coordinate system associated with the vessel. In such an example, the predetermined position and/or orientation can be defined relative to a particular object (e.g., vessel 10), or a particular coordinate system (e.g., a global coordinate system associated with vessel 10, a camera coordinate system associated with a particular depth sensor, a geographical coordinate system used to designate locations on Earth). As another example, a virtual boundary can be associated with a predetermined position and/or orientation with respect to an environment in a coordinate system that can be used to specify any location in the environment (e.g., a geographic coordinate system). In such an example, the predetermined position and/or orientation can be defined relative to a particular object (e.g., a particular object in the environment, such as a buoy, a navigation aid, etc.), or a particular coordinate system (e.g., a geographical coordinate system). In a more particular example, a virtual boundary can be associated with a no wake zone, an area of shallow water, a protected or otherwise restricted area, an area in which wakesurfing is not permitted, an area in which wakesurfing is permitted, etc. In some embodiments, virtual boundaries associated with a portion of an environment can be provided by an owner and/or operator of a vessel. For example, an owner and/or operator can add areas that the vessel is not permitted to be operated. In a more particular example, an owner and/or operator can provide a geofence indicating an area within which a vessel can be operated (e.g., a distance from a particular area), and a virtual boundary can be associated with the geofenced area. As another more particular example, an owner and/or operator can provide a geofence indicating an area(s) within which a vessel cannot be operated. Additionally or alternatively, in some embodiments, virtual boundaries associated with a portion of an environment can be provided by another entity (e.g., a source of charts and/or maps, a regulatory body, etc.).

In some embodiments, the information indicative of a position and orientation of the virtual boundary can be determined based on one or more constraints associated with a virtual boundary and/or XR scene. For example, a particular virtual boundary can be set to a particular distance from the marine vessel.

Additionally, in some embodiments, at 604, process 600 can receive data that can be used to render a representation of the virtual boundary in the XR scene. In some embodiments, process 600 can receive the data from any suitable location and/or at any suitable time. For example, process 600 can receive and/or retrieve such data from memory of a device executing at least a portion of process 600. As another example, process 600 can receive and/or retrieve such data from another device (e.g., a cloud server, a mobile device, memory of vessel 10, etc.). In some embodiments, process 600 can omit receiving such data. For example, if the data used to render the virtual boundary has already been received, or if the virtual boundary is a shape that a device executing process 600 can draw (e.g., using one or more primitives), process 600 can omit receiving such data at 504.

In some embodiments, data used to render a virtual boundary can include data for any suitable virtual boundary that can be added to an XR scene. For example, such data can include data that can be used to render a virtual boundary as described above in connection with FIGS. 5A1 to 5C. In some embodiments, for example, as described above in connection with FIGS. 4A and 4B, a virtual boundary can have any suitable size, shape, and relationship to vessel 10.

At 606, process 600 can generate and present an XR scene that includes the virtual boundary or boundaries based on a viewing perspective from which the XR scene is to be viewed, and a position and orientation of the virtual boundary. In some embodiments, process 600 can use any suitable technique or combination of techniques to generate and present the XR scene. For example, as described above in connection with FIGS. 1-5C, process 600 can render a view of the virtual boundary, and can place the rendered virtual boundary in an XR scene at a position and orientation based on the position and orientation of the virtual boundary received at 604, and based on a perspective from which the XR scene is expected to be viewed. As another example, process 600 can use one or more of processes 700, 800, and/or 900 to generate and present an XR scene that includes a virtual boundary.

In some embodiments, process 600 can use one or more anchor points (e.g., points on a hull of vessel 10, points corresponding to a relatively static portion of the environment in the XR scene) as a reference point for rendering and/or placing the virtual object(s). Additionally or alternatively, in some embodiments, process 600 can estimate a plane in the environment (e.g., a plane of a water surface in the environment), and can use the location of the plane in the XR scene as a reference for placing the virtual boundary. For example, process 600 can estimate a plane of a water surface in the scene, and can use the plane to determine a position (e.g., vertically) and orientation of a virtual boundary, which can mitigate changes in orientation of the virtual boundary if a non-static portion of the XR scene (e.g., a portion of vessel 10, a floating reference such as a buoy, etc.) is used to determine a placement of the virtual boundary. In such an example, orientation around a pitch and/or roll axis of the virtual boundary can be maintained to be relatively consistent with the water plane, and an influence of movement of vessel 10 and/or a user of a mobile device (e.g., a smartphone, tablet computer, or HMD) can be mitigated. Additionally or alternatively, in some embodiments, movement data from one or more motion sensors (e.g., main IMU 36 and/or one or more of IMUs 62-68, IMU 316, and/or head tracking system 314) can be used to determine movement of vessel 10 and/or a user, and such data can be used to adjust a position and/or orientation of the virtual boundary.

In some embodiments, a user can interact with the extended reality scene to provide input associated with a virtual boundary. For example, in some embodiments, a user can provide input (e.g., via a touchscreen, hand gestures, etc.) to move and/or resize the virtual boundary. As another example, in some embodiments, a user can provide input (e.g., via a touchscreen, hand gestures, etc.) to exclude a particular object(s) (e.g., a dock, a particular boat, a mooring ball, etc.) from being considered in connection with a virtual boundary, or to cause a particular object(s) to be considered that has been excluded from being considered in connection with a virtual boundary.

At 608, process 600 can receive an updated virtual boundary position and/or orientation associated with a virtual boundary, and/or can receive an updated perspective from which the virtual boundary is to be viewed. In some embodiments, a size and/or shape of a virtual boundary can change, resulting in an update in a position and/or orientation of the virtual boundary (e.g., based on a speed of vessel

10, a density of objects in the environment, time of day, etc.). For example, the virtual boundary can change size and/or shape based on any suitable change in condition(s).

Additionally or alternatively, in some embodiments, a perspective from which the virtual boundary and/or XR scene is viewed can change, resulting in a different view of the virtual boundary and/or XR scene. For example, vessel 10 can move, resulting in a different posture of one or more depth sensors 72-78 with respect to the virtual boundary and/or XR scene that is being presented (e.g., if vessel 10 pitches up at the bow, the water surface can move down within a FOV of depth sensor 72, and a position of a virtual boundary can be changed to stay consistent with the water surface, rather than being shown in the air). As another example, a mobile computing device being used to present an XR scene (e.g., a smartphone, a tablet computer, an HMD, etc.) can move relative to the virtual boundary and/or XR scene that is being presented. In such examples, positions and/or orientations of virtual boundary within the XR scene can be updated to remain consistent with respect to the physical environment (e.g., as though the objects are part of the physical environment, and do not change position and orientation with a change in position of vessel 10 and/or a device presenting the XR scene).

In some embodiments, process 600 can determine whether a virtual boundary is included within a portion of XR scene being presented. For example, if image data from a camera and/or depth sensor is being used to present the XR scene, if the pose of the camera with respect to the virtual boundary moves (e.g., due to movement of the vessel with respect to the environment), process 600 can determine whether the virtual boundary is still within a FOV of a different camera and/or depth sensor. If the virtual boundary is no longer visible in the current FOV, or another camera FOV includes more of a relevant portion of a virtual boundary (e.g., a portion nearer to an object in the environment), process 600 can change a camera that is used to capture image data used to generate and/or present the XR scene.

At 610, process 600 can determine whether an instruction has been received to remove a visualization of the virtual boundary from the XR scene, and/or whether there is at least one virtual boundary being visualized within the XR scene.

If process 600 determines that a virtual boundary is to be removed (e.g., a particular virtual boundary is removed, or presentation of the XR scene is to be stopped), process 600 can cause rendering of the virtual boundary to be inhibited (e.g., the virtual boundary can be removed from the XR scene).

If process 600 determines that no virtual boundaries remain and/or presentation of the XR scene is to be stopped ("YES" at 610), process 600 can end at 612.

Otherwise, if at least one virtual boundary remains in the XR scene ("NO" at 610), process 600 can move to 614.

At 614, process 600 can determine whether one or more virtual boundaries is within a frame of the XR scene. In some embodiments, updated virtual boundary position and/or orientation, and/or an updated perspective from which the XR scene is to be viewed can cause one or more virtual boundaries to be positioned outside of a visible portion of the XR scene. For example, if vessel 10 and/or a device presenting the XR scene moves, a virtual boundary can move out of a portion of the XR scene that is currently being presented. If a virtual boundary is not within a portion of the XR scene that is currently being presented, process 500 can omit rendering the virtual boundary.

If process 600 determines that no virtual boundary is within the frame ("NO" at 614), process 600 can return to 608. Otherwise, if process 600 determines that at least one virtual object is within the frame ("YES" at 614), process 600 can return to 606.

FIG. 7 shows an example of a process 700 for visualizing a virtual boundary in an extended reality scene using a two-dimensional display of the marine vessel in accordance with some embodiments of the disclosure. In some embodiments, process 700 can be used to generate and present the XR scene at 606.

At 702, process 700 can determine which camera of a vision system (e.g., which depth sensor of depth sensors 72-78) is to be used to present the XR scene. In some embodiments, process 700 can determine which camera(s) of the vessel vision system to use to present the XR scene based on which camera(s) has a FOV that includes a particular portion of the virtual boundary and/or a portion of the virtual boundary that is to be visualized (e.g., a portion with an object nearby, a portion in a direction of movement of the vessel, etc.). In some embodiments, process 700 can determine which camera(s) of the vessel vision system to use to present the XR scene based on user input selecting a camera to use.

At 704, process 700 can transform a position and orientation of the virtual boundary into a camera coordinate system. In some embodiments, a position and orientation of the virtual boundary can be specified in the global coordinate system associated with vessel 10, and process 700 can transform the position and orientation into a camera coordinate system associated with the camera(s) to be used to present the XR scene. For example, process 700 can use an inverse of a transform used to convert a location from the camera coordinate system to the corresponding location in the global coordinate system used by vessel 10.

In some embodiments, a position and orientation of the virtual boundary can be specified in another coordinate system (e.g., a geographic coordinate system, a coordinate system associated with a particular environment, etc.). In such embodiments, process 700 can determine a location and orientation in the global coordinate system (e.g., based on a transform between the coordinate system in which the position and orientation are specified and the global coordinate system) or a location and orientation in the camera coordinate system (e.g., based on the transform between the coordinate system in which the position and orientation are specified and the global coordinate system, and the transform between the global coordinate system and the camera coordinate system, or based on a transform between the system in which the position and orientation are specified and the camera coordinate system based on a fiducial with a known position and orientation).

At 706, process 700 can render a 2D image of the virtual boundary based on the position and orientation of the virtual boundary within the camera coordinate system. In some embodiments, process 700 can use any suitable technique to render the 2D image of the portion of the virtual boundary that is in the camera FOV, such as techniques described in connection with FIGS. 5A, 11, and 12.

At 708, process 700 can receive image data from one or more cameras to be used to present a real portion of the XR scene. In some embodiments, process 700 can receive image data generated by the camera(s) determined at 702.

At 710, process 700 can overlay the 2D image of the virtual boundary on the image data from the camera. In some embodiments, process 700 can overlay the 2D image of the virtual boundary using any suitable technique or combination of techniques. For example, in some embodiments, process 700 can overwrite a portion of the captured image data with the 2D image data. As yet another example, process 700 can use a rendering pipeline to generate a composite image that includes the original data and the 2D image data.

At 712, process 700 can present the XR scene using a 2D display, such as an MFD of the vessel (e.g., display 29). In some embodiments, process 700 can cause image data generated at 710 to be displayed on the 2D display.

Figure 8:
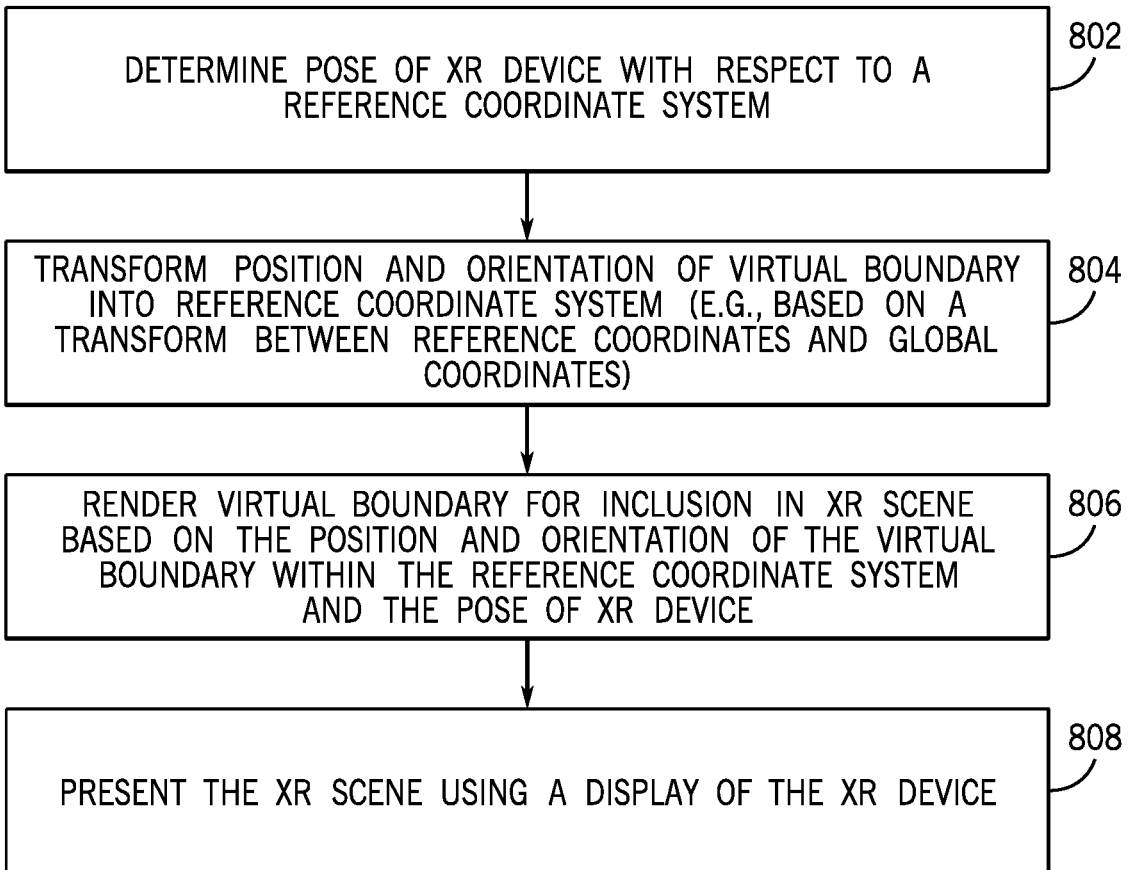
FIG. 8 shows an example of a process for visualizing a virtual boundary in an extended reality scene using a mobile extended reality device in accordance with some embodiments of the disclosure.

FIG. 8 shows an example of a process 800 for visualizing a virtual boundary in an extended reality scene using a mobile extended reality device in accordance with some embodiments of the disclosure. In some embodiments, process 800 can be used to generate and present the XR scene at 606.

At 802, process 800 can determine a pose of an XR device with respect to a reference coordinate system. In some embodiments, process 800 can use any suitable technique or combination of techniques to determine a pose of the XR device. For example, in some embodiments, process 800 can determine a pose of the XR device with respect to one or more portions of the environment (e.g., a stationary frame of reference). As another example, in some embodiments, process 800 can determine a pose of the XR device with respect to one or more anchor points in the environment (e.g., in an anchor point frame of reference). In some embodiments, a pose of the XR device can be determined based on a position and orientation of a fiducial mark in the environment at a known location.

At 804, process 800 can transform a position and orientation of a virtual boundary into the reference coordinate system. In some embodiments, process 800 can transform the position and orientation of the virtual boundary into the reference coordinate system using any suitable technique or combination of techniques. For example, in some embodiments, the position and orientation of the virtual boundary can be specified in the reference coordinate system (e.g., based on a position specified by a user within the reference coordinate system). As another example, the position and orientation of the virtual boundary can transformed from another coordinate system (e.g., the global coordinate system, a camera coordinate system, a geographic coordinate system) into the reference coordinate system based on a relationship between the coordinate systems.

At 806, process 800 can render the virtual boundary for inclusion in the XR scene based on the position and orientation of the virtual boundary within the reference coordinate system and a pose of the XR device. In some embodiments, process 800 can use any suitable technique to render the image of the virtual boundary, such as techniques described above in connection with FIG. 5B.

At 808, process 800 can present the XR scene using a display of the XR device. In some embodiments, process 800 can use any suitable technique or combination of techniques to present the XR scene, including the virtual boundary. For example, process 800 can cause the rendered image to be presented by a 2D display of a mobile computing device that is executing at least a portion of process 800 (e.g., a smartphone, a tablet computer, etc.) overlayed on an image of the environment within a FOV of a camera of the mobile computing device. As another example, process 800 can cause the rendered image to be presented by a display of an HMD that is executing at least a portion of process 800 (e.g., a mixed reality headset with a transparent display, a mixed reality headset with a non-transparent display operating in a passthrough mode) overlayed on the environment visible through the display (or overlayed on an image of the environment presented in the passthrough mode).

FIG. 9 shows an example of a process 900 for visualizing a virtual boundary in an extended reality scene using a heads-up display of a marine vessel in accordance with some embodiments of the disclosure. In some embodiments, process 900 can be used to generate and present the XR scene at 606.

At 902, process 900 can determine a perspective of a user with respect to a transparent display (e.g., HUD 35). In some embodiments, process 900 can use any suitable technique or combination of techniques to determine a perspective of a user with respect to the transparent display. For example, in some embodiments, a user can be expected to remain in a fixed position (e.g., in a seat of the vessel that is positioned in front of operation console 22), and process 900 can estimate the perspective of the user based on the fixed position. As another example, process 900 can use one or more devices that are configured to track a location of a user's eyes, and a gaze direction of the user to determine a perspective from which the user is expected to view the XR scene via the transparent display. As yet another example, process 900 can receive information about a perspective from which the user is expected to view the XR scene from another device, such as a wearable device that includes a camera that can determine the wearer's head and/or gaze direction (e.g., based on a position, size, and/or orientation of one or more fiducials in a FOV of a camera of the wearable device, such as fiducials 534 and/or 536).

At 904, process 900 can determine a transform between a global coordinate system and a reference coordinate system based on the perspective of the user determined at 902. For example, process 900 can determine a relationship between a reference coordinate system associated with the transparent display and the global coordinate system based on the perspective from which the XR scene is expected to be viewed, such that a virtual boundary presented by the transparent display appears to be located at a correct and consistent position and orientation with respect to the vessel as the user and/or vessel move.

At 906, process 900 can transform a position and orientation of the virtual boundary to be included in the XR scene based on the transform determined at 904.

At 908, process 900 can render a virtual object(s) for inclusion in the XR scene based on the position and orientation of the virtual object within the reference coordinate system. In some embodiments, process 900 can use any suitable technique to render the image of the virtual object, such as techniques described above in connection with FIG. 5C.

At 910, process 900 can present the XR scene using the transparent display. In some embodiments, process 900 can use any suitable technique or combination of techniques to present the XR scene, including the virtual boundary. For example, process 900 can cause the rendered image to be presented by the transparent display overlayed on the environment visible through the display.

Figure 10:
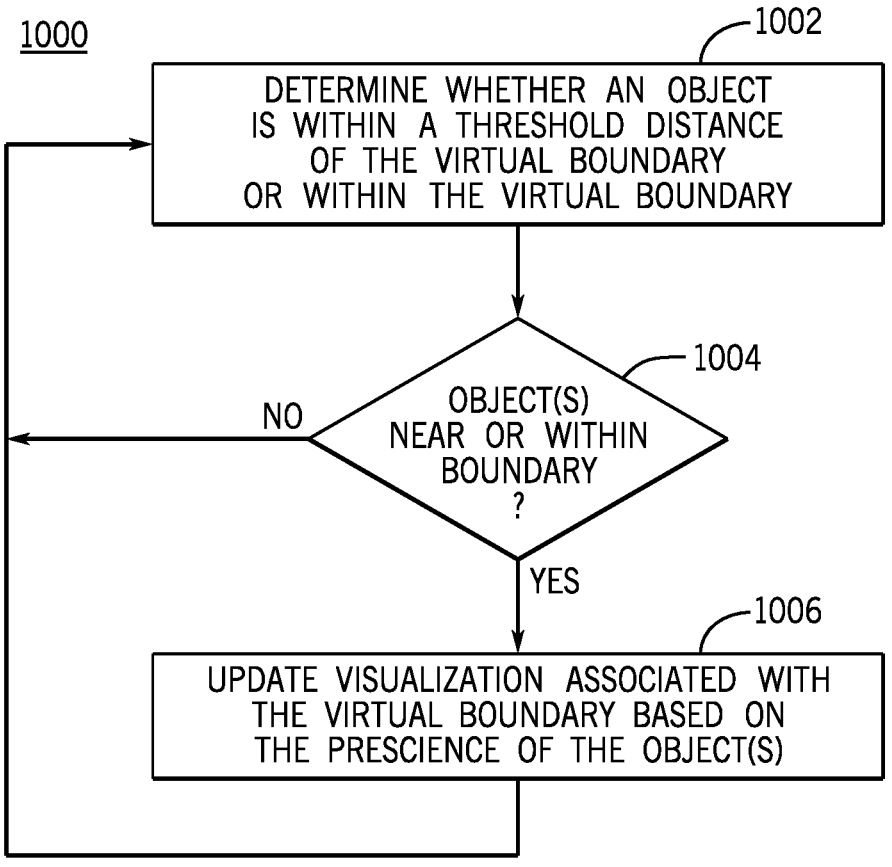
FIG. 10 shows an example of a process for updating a visualization of a virtual boundary based on proximity of one or more objects in accordance with some embodiments of the disclosure.

FIG. 10 shows an example of a process 1000 for updating a visualization of a virtual boundary based on proximity of one or more objects in accordance with some embodiments of the disclosure.

At 1002, process 1000 can determine whether an object is within a threshold distance of a virtual boundary and/or within a virtual boundary. In some embodiments, process 1000 can use any suitable technique or combination of techniques to determine where an object is with respect to a virtual boundary or boundaries. For example, process 1000 can use an occupancy grid to determine whether any cells of the occupancy grid that are within a threshold distance of the virtual boundary.

In some embodiments, process 1000 can use any suitable distance as the threshold distance. For example, the threshold distance can be based on the size of the virtual boundary (e.g., 10% of the virtual boundary radius; 10% of the virtual boundary distance, such as $d_{lateral}$, $d_{behind}$, or $d_{ahead}$; 20%, etc.). As another example, the threshold distance can be in a range of 3-10 meters. As yet another example, the threshold distance can be based on the relative speed of the object and the vessel. In a particular example, the threshold distance can be based on a time until the object intersects the virtual boundary. In such an example, if the object is moving relative to the vessel such that it is expected to intersect with the virtual boundary in 5 seconds (or a shorter or longer period, such as 3 seconds, 10 seconds, etc.), the object can be considered to be within the threshold distance. In another more particular example, the threshold distance can be smaller if the object is stationary with respect to the environment and/or is a static object (e.g., a rock, a dock, etc.).

In some embodiments, process 1000 can use different thresholds with different types of objects and/or whether the object(s) is moving relative to the vessel and/or relative to other portions of the environment. For example, in some embodiments, process 1000 can utilize a larger threshold distance (or any threshold distance) for certain types of objects (e.g., an object type can be determined using machine learning techniques, as described above in connection with FIG. 1). In such an example, the types of objects can be predetermined, and/or a user can specify how to treat different types of objects (e.g., via user input provided to a graphical user interface). Additionally, in some embodiments, process 1000 can exclude certain objects from consideration at 1002. For example, in some embodiments, process 1000 can consider only objects that are of a type corresponding to an object of interest at 1002. As another example, process 1000 can ignore certain animals, such as birds or other wildlife, which can be expected to avoid a moving vessel.

If process 1000 determines that there are no objects (or no objects of interest) intersecting the virtual boundary, within the virtual boundary, and/or within a threshold distance of the virtual boundary ("NO" at 1004), process 1000 can return to 1002.

Otherwise, if process 1000 determines that there is an object(s) intersecting the virtual boundary, within the virtual boundary, and/or within a threshold distance of the virtual boundary ("YES" at 1004), process 1000 can move to 1006.

At 1006, process 1000 can update a visualization associated with the virtual boundary based on the presence of the object(s) identified at 1002. In some embodiments, process 1000 can update the visualization using any suitable technique or combination of techniques. For example, process 1000 can change a color of a portion of the boundary near the object(s). As another example, process 1000 can change a shape of the boundary near the object(s). As yet another example, process 1000 can cause a portion of the boundary near the object(s) to blink or otherwise periodically (e.g., at regular intervals) change an aspect of how it is displayed (e.g., changing color periodically, changing shape periodically, blinking periodically, glowing periodically, growing and shrinking periodically, etc.). As still another example, process 1000 can cause an appearance of an object identified at 1002 to change, such as by adding an outline around the object (e.g., as shown in FIG. 5C), adding a colored mask over the object, etc. As a further example, can add a user interface element (e.g., an arrow, arcs, et.) to an XR scene based on the location of an object identified at 1002 (e.g., as described above in connection with FIG. 5C).

In some embodiments, process 1000 can cause an appearance of an object identified at 1002 to change based on a classification of the object (e.g., based on the type of object identified), a location of the object, and/or one or more characteristics of the object. For example, different types of objects can be outlined with different colors, masked with different colors and/or patterns, associated or not associated with a user interface element(s) or different user interface elements (e.g., arrows, arcs, etc.), highlighted using different effects (e.g., a solid outline, a blinking outline, a shrinking and growing outline, a glowing outline, etc.), etc. As another example, objects moving at different velocities with respect to the vessel and/or virtual boundary can be outlined with different colors, masked with different colors and/or patterns, associated or not with a user interface element(s) or different user interface elements, highlighted using different effects, etc. As yet another example, objects can be presented differently (e.g., with different colors, patterns, user interface elements, effects, etc.) based on whether the object is intersecting the virtual boundary, within the virtual boundary, or, in some embodiments, within a threshold distance of the virtual boundary.

Additionally, in some embodiments, at 1006, process 1000 can cause any suitable alert to be presented. For example, such an alert can include a change to an appearance of a virtual boundary and/or an object, as described above. As another example, an alert can include text that is presented (e.g., using a display used to present the XR scene, or another display, such as a display of another device that is in communication with a device presenting the XR scene). As yet another example, an alert can include an audio component, such as an audio message, tone, alarm, etc. In such an example, an audio portion of an alert can be presented by a speaker of a device executing at least a portion of process 1000 and/or another device (e.g., a mobile device that is in communication with a device executing at least a portion of process 1000). As still another example, an alert can include a haptic component. In such an example, a haptic portion of an alert can be provided via any suitable haptic device, such as a haptic device integrated into a device executing at least a portion of process 1000 and/or another device (e.g., a mobile device that is in communication with a device executing at least a portion of process 1000).

Figure 11:
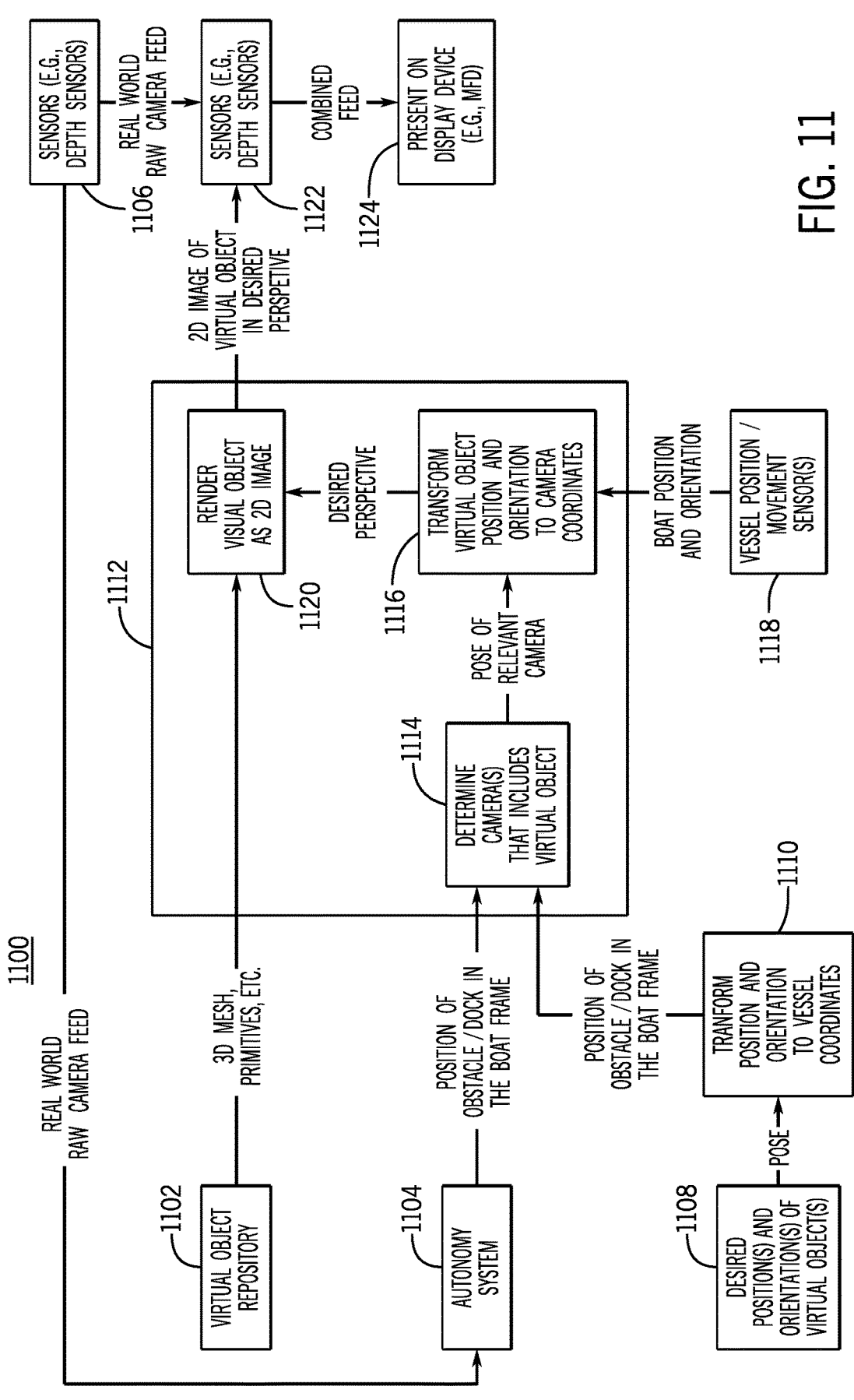
FIG. 11 shows an example of a flow for presenting one or more virtual boundaries in an extended reality scene using a two-dimensional display of the marine vessel in accordance with some embodiments of the disclosure.

FIG. 11 shows an example of a flow 1100 for presenting one or more virtual boundaries in an extended reality scene using a two-dimensional display of the marine vessel in accordance with some embodiments of the disclosure.

In some embodiments, flow 1100 can include receiving a 3D model(s) (e.g., a 3D mesh) and/or one or more primitives that can be used to render a virtual boundary and/or any other virtual object(s) from a virtual object repository 1102 (e.g., memory, such as memory 232 or memory 252). In some embodiments, receiving a 3D model and/or primitives from virtual object repository 1102 can be omitted. For example, where a virtual boundary can be drawn (e.g., using relatively simple lines and/or flat geometric shapes), flow 1100 can omit receiving a 3D model(s) and/or primitives used to render a virtual boundary.

In some embodiments, a processor(s) (e.g., processor 224, CCM 24, etc.) executing one or more components of an autonomy system 1104 can receive image data and/or depth data from one or more depth sensors and/or other sensors 1106 associated with vessel 10. In some embodiments, autonomy system 1104 can utilize information received from sensors 1106 to determine a position and/or classification of one or more objects in an environment of vessel 10 (e.g., as described above in connection with FIG. 1).

In some embodiments, flow 1100 can include receiving, at 1108, a desired position(s) and orientation(s) of one or more virtual boundaries in a particular coordinate system (e.g., the global coordinate system, a camera coordinate system, a stationary frame of reference, a geographic coordinate system, etc.). As described above, in some embodiments, a desired position can be based on user input, predetermined locations, one or more constraints, etc. Additionally or alternatively, a position and orientation of a virtual boundary can be based on a size and/or shape of a virtual boundary used by autonomy system (e.g., buffer zone 404, virtual boundary 412, etc.), which can be used in path planning, autonomous or semi-autonomous control, collision avoidance, etc.

In some embodiments, flow 1100 can include transforming, at 1110, the position and orientation of the virtual boundary into the global coordinate system (e.g., if the position and orientation are in a different coordinate system). For example, if the position and orientation are in the geographic coordinate system (e.g., as a latitude, longitude, and heading), flow 1100 can include transforming the position and orientation in the geographic coordinate system to the global coordinate system based on the current location (e.g., latitude and longitude based on a geographic location received from GPS receiver 40, and/or any other suitable sensors) and orientation (e.g., heading, received from GPS receiver 40, main IMU 36, and/or any other suitable sensors) of the vessel, which can be used to relate the geographic coordinate system to the global coordinate system.

In some embodiments, flow 1100 can include rendering, at 1112, the virtual boundary in a perspective from which the virtual object is to be viewed. In some embodiments, rendering can include determining, at 1114, a camera (e.g., depth sensor) from which the XR scene is to be viewed. In some embodiments, determining the camera at 1114 can use a position of the virtual boundary in the global coordinate system (e.g., from 1110) and/or a location of one or more objects in the environment and/or a visible FOV for each camera (e.g., from 1104).

In some embodiments, rendering at 1112 can include transforming, at 1116, the position and orientation of the virtual object(s) into the camera coordinate system of the camera determined at 1114.

In some embodiments, rendering at 1112 can include rendering, at 1120, a 2D image of the virtual boundary based on the 3D model(s), primitives, drawing, etc., of the virtual boundary, the perspective of the camera on the XR scene, and the location and orientation of the virtual boundary with respect to the camera. For example, at 1120, flow 1100 can include rendering the virtual boundary using a virtual camera position that corresponds to the pose of the camera with respect to the virtual object(s).

In some embodiments, flow 1100 can include combining, at 1122, the rendered 2D image and image data from the camera (e.g., as described above in connection with FIGS. 5A1 and 5A2, 6, and 7).

In some embodiments, flow 1100 can include presenting, at 1124, the combined a view of an XR scene using a 2D display of the vessel (e.g., as described above in connection with FIGS. 5A1 and 5A2, 6, and 7).

Figure 12:
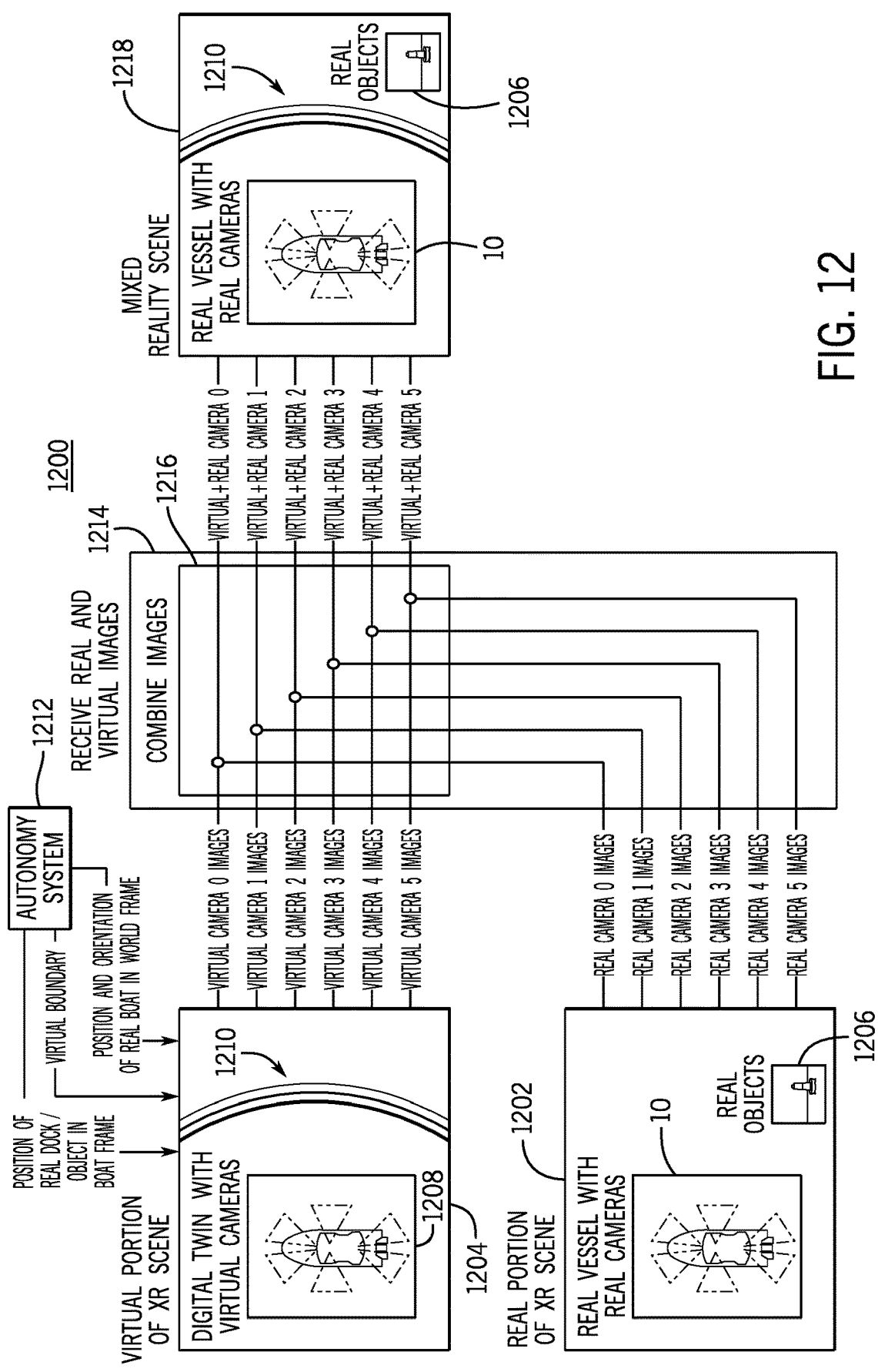
FIG. 12 shows an example of a flow for presenting one or more virtual boundaries in an extended reality scene using a virtual boundary rendered using a 3D rendering pipeline in a digital twin of the extended reality scene in accordance with some embodiments of the disclosure.

FIG. 12 shows an example of a flow 1200 for presenting one or more virtual boundaries in an extended reality scene using a virtual boundary rendered using a 3D rendering pipeline in a digital twin of the extended reality scene in accordance with some embodiments of the disclosure.

In some embodiments, flow 1200 can include a real portion 1202 of an XR scene, and a virtual portion 1204 of an XR scene. In some embodiments, real portion 1202 can include vessel 10, having various cameras (e.g., depth sensors 72-78) each having a FOV of the physical environment in real portion 1202, including at least one camera that captures image data of an object 1206. Additionally, in some embodiments, virtual portion 1204 can include a digital twin 1208 of vessel 10, having various virtual cameras, each corresponding to a camera of vessel 10 and having a corresponding FOV of virtual portion 1204 to the FOV of the camera's FOV of real portion 1202. Virtual portion 1204 can include a virtual boundary 1210 within a portion of the scene, which can be rendered for each virtual camera that includes virtual boundary 1210 within its FOV. In some embodiments, virtual portion 1204, including digital twin 1208 and virtual object 1210 can be generated using a real-time graphics engine (e.g., a game engine, such as UNREAL ENGINE, UNITY, etc.), which can render virtual boundary 1210 from the perspective of each virtual camera. Additionally, in some embodiments, the graphics engine can receive information from an autonomy system 1212 of vessel 10, which can include information about objects in the environment (e.g., types of objects, location of objects with respect to vessel 10, an estimated plane of a water surface, etc.), and/or position and/or orientation information of vessel 10 in any suitable coordinate system (e.g., geographic coordinates). In some embodiments, the graphics engine can use information from autonomy system 1212 to determine placement of virtual boundary 1210, in virtual portion 1204 (e.g., with respect to the plane of a water surface, to avoid collisions with real objects, etc.), and/or to determine a position and/or orientation of digital twin 1208 with respect to objects in real portion 1202. For example, the graphics engine can receive a size and/or shape of a virtual boundary from autonomy system 1212, which can be used to determine a position and/or orientation at which to place the virtual boundary in with respect to digital twin 1208 in virtual portion 1204. As another example, the graphics engine can use position and orientation information (e.g., from INS 60) and/or motion information (e.g., from main IMU 36 and/or one or more of IMUs 62-68) to determine a position and orientation of digital twin 1208 with respect to virtual portion 1204, such that digital twin 1208 is maintained, at least approximately, in the same position and orientation with respect to the virtual portion 1204 as the position and orientation of vessel 10 with respect to real portion 1202.

In some embodiments, flow 1200 can include receiving, at 1214, image data from real cameras of vessel 10, and image data from virtual cameras of digital twin 1208 (e.g., at a processor(s), such as processor 224, processor 244, or CCM 24).

In some embodiments, flow 1200 can include combining, at 1216, the real image data and corresponding virtual image data (e.g., using any suitable image fusion technique or combination of techniques), such that objects in virtual portion 1204 are included in the combined image data with objects from real portion 1206.

In some embodiments, flow 1200 can include presenting (e.g., using display 29) a portion of a mixed reality scene 1218 (e.g., using image data generated at 1014 for a particular camera FOV) that includes vessel 10, real object 1206, and virtual boundary 1210. In some embodiments, as vessel 10 moves through real portion 1202, the movements can be reflected by digital twin 1208 in virtual portion 1204, such that a position of virtual boundary 1210 can be maintained relative to vessel 10 as the vessel moves through real portion 1002.

Further Examples Having a Variety of Features

Implementation examples are described in the following numbered clauses:

1. A method for presenting virtual objects in a scene that includes a non-virtual marine vessel, the method comprising: receiving information indicative of a boundary position at which to present a virtual boundary within an extended reality (XR) scene with respect to the marine vessel; presenting, using a display device, the XR scene including the virtual boundary based on the boundary position, wherein a size and view of the virtual boundary in the XR scene is based on a viewing perspective at which the XR scene is viewed; and updating the XR scene as the marine vessel moves.

2. The method of clause 1, further comprising: receiving virtual boundary data; determining that the virtual boundary is at least partially within the field of view of the first camera, wherein the plurality of cameras includes at least the first camera and a second camera, wherein each of the plurality of cameras is configured to be mounted to the marine vessel with an associated field of view of an environment of the marine vessel, and wherein each of the plurality of cameras is associated with a three-dimensional camera coordinate system; determining a position of the virtual boundary within the camera coordinate system associated with the first camera; rendering a two-dimensional image of the virtual boundary based on the virtual boundary data, the position of the virtual boundary within the camera coordinate system associated with the first camera, and a viewing perspective of the first camera; receiving image data from the first camera; generating a view of the XR scene based on the image data and the two-dimensional image of the virtual boundary, such that the virtual boundary appears to be present in the view of the XR scene at the boundary position; and presenting, using the display device, the view of the XR scene.

3. The method of clause 2, further comprising: determining that the marine vessel has moved with respect to the position of the virtual boundary within the camera coordinate system associated with the first camera; determining an updated position of the virtual boundary within the camera coordinate system associated with the first camera based on movement of the marine vessel; rendering a second two-dimensional image of the virtual boundary based on the updated position of the virtual boundary and an updated viewing perspective of the first camera; receiving additional image data from the first camera; generating an updated view of the XR scene based on the additional image data and the second two-dimensional image of the virtual boundary, such that the virtual boundary appears to be present in the updated view of the XR scene at the boundary position; and presenting, using the display device, the updated view of the XR scene.

4. The method of any one of clauses 2 or 3, wherein the display device comprises a multi-function display of the marine vessel.

5. The method of any one of clauses 1 to 4, further comprising: generating, using a real-time graphics engine, a digital twin of the marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with one of a plurality of cameras associated with the marine vessel, wherein the plurality of cameras includes at least the first camera and a second camera, wherein each of the plurality of cameras is configured to be mounted to the marine vessel with an associated field of view of an environment of the marine vessel, and wherein each of the plurality of cameras is associated with a three-dimensional camera coordinate system; receiving virtual boundary data; placing the virtual boundary in the virtual environment with a virtual boundary position corresponding the boundary position; determining that the virtual boundary is at least partially within the field of view of the first virtual camera; rendering, using the real-time graphics engine, a two-dimensional image of the virtual environment from a point of view of the first virtual camera based on the virtual boundary data; receiving image data from the first camera; generating a view of the XR scene based on the image data and the two-dimensional image of the virtual environment, such that the virtual boundary appears to be present in the view of the XR scene at the boundary position; and presenting, using the display device, the view of the XR scene.

6. The method of clause 1, wherein the display device comprises a display of a wearable extended reality device, and extended reality device further comprises a head tracking device in communication with at least one hardware processor.

7. The method of clause 6, further comprising: receiving virtual boundary data; determining a position and orientation of the wearable extended reality device with respect to the marine vessel based at least in part on data from the head tracking device; determining a position and orientation of the virtual object in a reference coordinate system associated with the wearable extended reality device; determining that the virtual boundary position is at least partially within a field of view of the wearable extended reality device based on the boundary position; rendering an image of the virtual boundary based on the virtual boundary data, the position and orientation of the virtual object within the reference coordinate system, and the position and orientation of the wearable extended reality device; and presenting, using the display device, the rendered image of the virtual boundary in a position on the display device such that the virtual boundary appears to be present in the view of the XR scene at the boundary position.

8. The method of clause 1, wherein the display device comprises a display of a heads-up display (HUD) device integrated into a windshield of the marine vessel.

9. The method of clause 8, further comprising: receiving virtual boundary data; determining the viewing perspective from which a user is viewing the HUD; determining a position and orientation of the virtual boundary in a reference coordinate system associated with the HUD and the viewing perspective of the user; determining that the virtual boundary is at least partially within a field of view of the user via the HUD; rendering an image of the virtual boundary based on the position of the virtual boundary within the reference coordinate system; and presenting, using the display device, the rendered image of the virtual boundary in a position on the HUD such that the virtual boundary appears to the user to be present in the view of the XR scene at the boundary position.

10. The method of any one of clauses 1 to 9, further comprising receiving, from an autonomy system of the marine vessel, virtual boundary data comprising a shape and size of the virtual boundary.

11. A system comprising: one or more processors configured to: perform a method of any of clauses 1 to 10.

12. The system of clause 11, further comprising: the display device; and a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system.

13. A non-transitory computer-readable medium storing computer-executable code, comprising code for causing a computer to cause a processor to: perform a method of any of clauses 1 to 10.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE-PROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 6-10 can be executed or performed in any suitable order or sequence not limited to the order and sequence shown and described in the figures. Also, some of the above steps of the processes of FIGS. 6-10 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for visualizing a virtual boundary in a scene that includes a non-virtual marine vessel, the system comprising:

a display device; and one or more hardware processors configured to:

receive information indicative of a boundary position at which to present a virtual boundary within an extended reality (XR) scene with respect to the marine vessel;

present, using the display device, the XR scene including the virtual boundary based on the boundary position, wherein a size and view of the virtual boundary in the XR scene is based on a viewing perspective at which the XR scene is viewed and an orientation of the viewing perspective with respect to a water surface in a marine environment of the marine vessel such that the virtual boundary appears to be on the water surface in the XR scene at the boundary position; and update the XR scene as the marine vessel moves such that the virtual boundary appears to remain on the water surface in the XR scene.

2. The system of claim 1, the system further comprising:

a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system;

wherein the one or more hardware processors are further configured to:

receive virtual boundary data;

determine that the virtual boundary is at least partially within the field of view of the first camera;

determine a position of the virtual boundary within the camera coordinate system associated with the first camera;

render a two-dimensional image of the virtual boundary based on the virtual boundary data, the position of the virtual boundary within the camera coordinate system associated with the first camera, and a viewing perspective of the first camera;

receive image data from the first camera;

generate a view of the XR scene based on the image data and the two-dimensional image of the virtual boundary, such that the virtual boundary appears to be present in the view of the XR scene at the boundary position; and present, using the display device, the view of the XR scene.

3. The system of claim 2, wherein the one or more hardware processors are further configured to:

determine that the marine vessel has moved with respect to the position of the virtual boundary within the camera coordinate system associated with the first camera;

determine an updated position of the virtual boundary within the camera coordinate system associated with the first camera based on movement of the marine vessel;

render a second two-dimensional image of the virtual boundary based on the updated position of the virtual boundary and an updated viewing perspective of the first camera;

receive additional image data from the first camera;

generate an updated view of the XR scene based on the additional image data and the second two-dimensional image of the virtual boundary, such that the virtual boundary appears to be present in the updated view of the XR scene at the boundary position; and present, using display device, the updated view of the XR scene.

4. The system of claim 2, wherein the display device comprises a multi-function display of the marine vessel.

5. The system of claim 1, the system further comprising:

a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system;

wherein the one or more hardware processors are further configured to:

generate, using a real-time graphics engine, a digital twin of the marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with one of the plurality of cameras;

receive virtual boundary data;

place the virtual boundary in the virtual environment with a virtual boundary position corresponding to the boundary position;

determine that the virtual boundary is at least partially within the field of view of the first virtual camera;

render, using the real-time graphics engine, a two-dimensional image of the virtual environment from a point of view of the first virtual camera based on the virtual boundary data;

receive image data from the first camera;

generate a view of the XR scene based on the image data and the two-dimensional image of the virtual environment, such that the virtual boundary appears to be present in the view of the XR scene at the boundary position; and present, using the display device, the view of the XR scene.

6. The system of claim 1, wherein the display device comprises a display of a wearable extended reality device, and wherein the system further comprises a head tracking device in communication with at least one hardware processor of the one or more hardware processors.

7. The system of claim 6, wherein the one or more hardware processors are further configured to:

receive virtual boundary data;

determine a position and orientation of the wearable extended reality device with respect to the marine vessel based at least in part on data from the head tracking device;

determine a position and orientation of a virtual object in a reference coordinate system associated with the wearable extended reality device;

determine that the virtual boundary position is at least partially within a field of view of the wearable extended reality device based on the boundary position;

render an image of the virtual boundary based on the virtual boundary data, the position and orientation of the virtual object within the reference coordinate system, and the position and orientation of the wearable extended reality device; and present, using the display device, the rendered image of the virtual boundary in a position on the display device such that the virtual boundary appears to be present in the view of the XR scene at the boundary position.

8. The system of claim 1, wherein the display device comprises a display of a heads-up display (HUD) device integrated into a windshield of the marine vessel.

9. The system of claim 8, wherein the one or more hardware processors are further configured to:

receive virtual boundary data;

determine the viewing perspective from which a user is viewing the HUD;

determine a position and orientation of the virtual boundary in a reference coordinate system associated with the HUD and the viewing perspective of the user;

determine that the virtual boundary is at least partially within a field of view of the user via the HUD;

render an image of the virtual boundary based on the position of the virtual boundary within the reference coordinate system; and present, using the display device, the rendered image of the virtual boundary in a position on the HUD such that the virtual boundary appears to the user to be present in the view of the XR scene at the boundary position.

10. The system of claim 1, wherein the one or more hardware processors are further configured to:

receive, from an autonomy system of the marine vessel, virtual boundary data comprising a shape and size of the virtual boundary.

11. A method for visualizing a virtual boundary in a scene that includes a non-virtual marine vessel, the method comprising:

receiving information indicative of a boundary position at which to present a virtual boundary within an extended reality (XR) scene with respect to the marine vessel;

presenting, using a display device, the XR scene including the virtual boundary based on the boundary position, wherein a size and view of the virtual boundary in the XR scene is based on a viewing perspective at which the XR scene is viewed and an orientation of the viewing perspective with respect to a water surface in a marine environment of the marine vessel such that the virtual boundary appears to be on the water surface in the XR scene at the boundary position; and updating the XR scene as the marine vessel moves such that the virtual boundary appears to remain on the water surface in the XR scene.

12. The method of claim 11, further comprising:

receiving virtual boundary data;

determining that the virtual boundary is at least partially within the field of view of a first camera of a plurality of cameras, wherein the plurality of cameras includes at least the first camera and a second camera, wherein each of the plurality of cameras is configured to be mounted to the marine vessel with an associated field of view of an environment of the marine vessel, and wherein each of the plurality of cameras is associated with a three-dimensional camera coordinate system;

determining a position of the virtual boundary within the camera coordinate system associated with the first camera;

rendering a two-dimensional image of the virtual boundary based on the virtual boundary data, the position of the virtual boundary within the camera coordinate system associated with the first camera, and a viewing perspective of the first camera;

receiving image data from the first camera;

generating a view of the XR scene based on the image data and the two-dimensional image of the virtual boundary, such that the virtual boundary appears to be present in the view of the XR scene at the boundary position; and presenting, using the display device, the view of the XR scene.

13. The method of claim 12, further comprising:

determining that the marine vessel has moved with respect to the position of the virtual boundary within the camera coordinate system associated with the first camera;

determining an updated position of the virtual boundary within the camera coordinate system associated with the first camera based on movement of the marine vessel;

rendering a second two-dimensional image of the virtual boundary based on the updated position of the virtual boundary and an updated viewing perspective of the first camera;

receiving additional image data from the first camera;

generating an updated view of the XR scene based on the additional image data and the second two-dimensional image of the virtual boundary, such that the virtual boundary appears to be present in the updated view of the XR scene at the boundary position; and presenting, using the display device, the updated view of the XR scene.

14. The method of claim 12, wherein the display device comprises a multi-function display of the marine vessel.

15. The method of claim 11, further comprising:

generating, using a real-time graphics engine, a digital twin of the marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with one of a plurality of cameras associated with the marine vessel, wherein the plurality of cameras includes at least the first camera and a second camera, wherein each of the plurality of cameras is configured to be mounted to the marine vessel with an associated field of view of an environment of the marine vessel, and wherein each of the plurality of cameras is associated with a three-dimensional camera coordinate system;

receiving virtual boundary data;

placing the virtual boundary in the virtual environment with a virtual boundary position corresponding to the boundary position;

determining that the virtual boundary is at least partially within the field of view of the first virtual camera;

rendering, using the real-time graphics engine, a two-dimensional image of the virtual environment from a point of view of the first virtual camera based on the virtual boundary data;

receiving image data from the first camera;

generating a view of the XR scene based on the image data and the two-dimensional image of the virtual environment, such that the virtual boundary appears to be present in the view of the XR scene at the boundary position; and presenting, using the display device, the view of the XR scene.

16. The method of claim 11, wherein the display device comprises a display of a wearable extended reality device, and extended reality device further comprises a head tracking device in communication with at least one hardware processor.

17. The method of claim 16, further comprising:

receiving virtual boundary data;

determining a position and orientation of the wearable extended reality device with respect to the marine vessel based at least in part on data from the head tracking device;

determining a position and orientation of a virtual object in a reference coordinate system associated with the wearable extended reality device;

determining that the virtual boundary position is at least partially within a field of view of the wearable extended reality device based on the boundary position;

rendering an image of the virtual boundary based on the virtual boundary data, the position and orientation of the virtual object within the reference coordinate system, and the position and orientation of the wearable extended reality device; and presenting, using the display device, the rendered image of the virtual boundary in a position on the display device such that the virtual boundary appears to be present in the view of the XR scene at the boundary position.

18. The method of claim 11, wherein the display device comprises a display of a heads-up display (HUD) device integrated into a windshield of the marine vessel.

19. The method of claim 18, further comprising:

receiving virtual boundary data;

determining the viewing perspective from which a user is viewing the HUD;

determining a position and orientation of the virtual boundary in a reference coordinate system associated with the HUD and the viewing perspective of the user;

determining that the virtual boundary is at least partially within a field of view of the user via the HUD;

rendering an image of the virtual boundary based on the position of the virtual boundary within the reference coordinate system; and presenting, using the display device, the rendered image of the virtual boundary in a position on the HUD such that the virtual boundary appears to the user to be present in the view of the XR scene at the boundary position.

20. The method of claim 11, further comprising receiving, from an autonomy system of the marine vessel, virtual boundary data comprising a shape and size of the virtual boundary.

*    *    *    *    *